United States Patent
Holz et al.

(10) Patent No.: US 9,632,572 B2
(45) Date of Patent: Apr. 25, 2017

(54) ENHANCED FIELD OF VIEW TO AUGMENT THREE-DIMENSIONAL (3D) SENSORY SPACE FOR FREE-SPACE GESTURE INTERPRETATION

(71) Applicant: Leap Motion, Inc., San Francisco, CA (US)

(72) Inventors: David S Holz, San Francisco, CA (US); Paul Durdik, Foster City, CA (US)

(73) Assignee: Leap Motion, Inc., San Francisco, CA (US)

( * ) Notice: Subject to any disclaimer, the term of this patent is extended or adjusted under 35 U.S.C. 154(b) by 321 days.

(21) Appl. No.: 14/506,596

(22) Filed: Oct. 3, 2014

(65) Prior Publication Data

US 2015/0097768 A1    Apr. 9, 2015

Related U.S. Application Data

(60) Provisional application No. 61/886,586, filed on Oct. 3, 2013.

(51) Int. Cl.
  *G06F 3/00* (2006.01)
  *G06F 3/01* (2006.01)
  (Continued)

(52) U.S. Cl.
  CPC ............ *G06F 3/005* (2013.01); *G06F 1/1686* (2013.01); *G06F 3/017* (2013.01); *G06F 3/0425* (2013.01); *G06F 2200/1633* (2013.01)

(58) Field of Classification Search
  None
  See application file for complete search history.

(56) References Cited

U.S. PATENT DOCUMENTS

| | | | |
|---|---|---|---|
| 8,035,624 B2 * | 10/2011 | Bell | G06F 3/011 345/175 |
| 8,605,202 B2 | 12/2013 | Muijs et al. | |

(Continued)

OTHER PUBLICATIONS

International Search Report and Written Opinion, PCT Application No. PCT/US2014/013012 (WO 2014116991), dated May 14, 2014, 12 pages.

(Continued)

*Primary Examiner* — Jennifer Mehmood
*Assistant Examiner* — Krishna Neupane
(74) *Attorney, Agent, or Firm* — Haynes Beffel & Wolfeld; Ernest J. Beffell, Jr.

(57) ABSTRACT

The technology disclosed relates to enhancing the fields of view of one or more cameras of a gesture recognition system for augmenting the three-dimensional (3D) sensory space of the gesture recognition system. The augmented 3D sensory space allows for inclusion of previously uncaptured of regions and points for which gestures can be interpreted i.e. blind spots of the cameras of the gesture recognition system. Some examples of such blind spots include areas underneath the cameras and/or within 20-85 degrees of a tangential axis of the cameras. In particular, the technology disclosed uses a Fresnel prismatic element and/or a triangular prism element to redirect the optical axis of the cameras, giving the cameras fields of view that cover at least 45 to 80 degrees from tangential to the vertical axis of a display screen on which the cameras are mounted.

20 Claims, 18 Drawing Sheets

(51) Int. Cl.
*H04N 13/02* (2006.01)
*G06F 1/16* (2006.01)
*G06F 3/042* (2006.01)

(56) References Cited

U.S. PATENT DOCUMENTS

| | | | |
|---|---|---|---|
| 9,070,019 B2 | 6/2015 | Holz | |
| 2002/0008139 A1 | 1/2002 | Albertelli | |
| 2002/0041327 A1 | 4/2002 | Hildreth et al. | |
| 2005/0238201 A1 | 10/2005 | Shamaie | |
| 2006/0262421 A1 | 11/2006 | Matsumoto et al. | |
| 2007/0014466 A1* | 1/2007 | Baldwin | G01N 21/55 382/145 |
| 2008/0106746 A1 | 5/2008 | Shpunt et al. | |
| 2010/0027845 A1 | 2/2010 | Kim et al. | |
| 2010/0053612 A1 | 3/2010 | Ou-Yang et al. | |
| 2011/0296353 A1 | 12/2011 | Ahmed et al. | |
| 2012/0113316 A1 | 5/2012 | Ueta et al. | |
| 2013/0050425 A1* | 2/2013 | Im | H04N 13/0207 348/46 |
| 2013/0182079 A1 | 7/2013 | Holz | |
| 2013/0182897 A1 | 7/2013 | Holz | |
| 2013/0258140 A1 | 10/2013 | Lipson et al. | |
| 2014/0132738 A1* | 5/2014 | Ogura | H04N 13/0239 348/47 |

OTHER PUBLICATIONS

Japanese Patent with English Abstract, JP 2010-060548 A, Mar. 18, 2010, 19 pages.
Japanese Patent with English Abstract, JP 2011-107681 A, Jun. 2, 2011, 16 pages.
Japanese Patent with English Abstract, JP 2012-527145 A, Nov. 1, 2012, 30 pages.
U.S. Appl. No. 14/151,394—Office Action dated Oct. 22, 2015, 26 pgs.
U.S. Appl. No. 14/151,394—Office Action dated Apr. 5, 2016, 26 pgs.
U.S. Appl. No. 14/151,394—Office Action dated Sep. 30, 2016, 40 pages.

* cited by examiner

ENHANCED FIELD OF VIEW TO AUGMENT THREE-DIMENSIONAL (3D) SENSORY SPACE FOR FREE-SPACE GESTURE INTERPRETATION

PRIORITY DATA

This application claims priority to U.S. Provisional Patent Application No. 61/886,586 filed Oct. 3, 2013 entitled "DIRECTING LIGHT FOR FREE SPACE GESTURE CONTROL AND COMMUNICATION". The provisional application is hereby incorporated by reference for all purposes.

FIELD OF THE TECHNOLOGY DISCLOSED

The technology disclosed relates, in general, to free-space gesture recognition, and in particular implementations to augmenting a three-dimensional (3D) sensory space of a gesture recognition system by enhancing a field of view of an image capture device of the gesture recognition system.

INCORPORATIONS

Materials incorporated by reference in this filing include the following:

"FREE-SPACE USER INTERFACE AND CONTROL USING VIRTUAL CONSTRUCTS," U.S. Non. Prov. application Ser. No. 14/154,730, filed 14 Jan. 2014, "DYNAMIC USER INTERACTIONS FOR DISPLAY CONTROL," U.S. Prov. App. No. 61/752,725, filed 15 Jan. 2013, "SYSTEMS AND METHODS OF INTERACTING WITH A VIRTUAL GRID IN A THREE-DIMENSIONAL (3D) SENSORY SPACE," U.S. Prov. App. No. 62/007,885, filed 4 Jun. 2014, "PREDICTIVE INFORMATION FOR FREE-SPACE GESTURE CONTROL AND COMMUNICATION," U.S. Prov. App. No. 61/873,758, filed 4 Sep. 2013, "VELOCITY FIELD INTERACTION FOR FREE-SPACE GESTURE INTERFACE AND CONTROL," U.S. Prov. App. No. 61/891,880, filed 16 Oct. 2013, "INTERACTIVE TRAINING RECOGNITION OF FREE-SPACE GESTURES FOR INTERFACE AND CONTROL," U.S. Prov. App. No. 61/872,538, filed 30 Aug. 2013, "METHODS AND SYSTEMS FOR IDENTIFYING POSITION AND SHAPE OF OBJECTS IN THREE-DIMENSIONAL SPACE," U.S. Prov. App. No. 61/587,554, filed 17 Jan. 2012, "SYSTEMS AND METHODS FOR CAPTURING MOTION IN THREE-DIMENSIONAL SPACE," U.S. Prov. App. No. 61/724,091, filed 8 Nov. 2012, "VEHICLE MOTION SENSORY CONTROL," U.S. Prov. App. No. 62/005,981, filed 30 May 2014, "MOTION CAPTURE USING CROSS-SECTIONS OF AN OBJECT," U.S. application Ser. No. 13/414,485, filed 7 Mar. 2012, and "SYSTEM AND METHODS FOR CAPTURING MOTION IN THREE-DIMENSIONAL SPACE," U.S. application Ser. No. 13/742,953, filed 16 Jan. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Motion-capture systems have been deployed to facilitate numerous forms of contact-free interaction with a computer-driven display device. Simple applications allow a user to designate and manipulate on-screen artifacts using hand gestures, while more sophisticated implementations facilitate participation in immersive virtual environments, e.g., by waving to a character, pointing at an object, or performing an action such as swinging a golf club or baseball bat. The term "motion capture" refers generally to processes that capture movement of a subject in 3D space and translate that movement into, for example, a digital model or other representation.

Most existing motion-capture systems rely on markers or sensors worn by the subject while executing the motion and/or on the strategic placement of numerous cameras in the environment to capture images of the moving subject from different angles. As described in U.S. Ser. No. 13/414,485 (filed on Mar. 7, 2012) and Ser. No. 13/724,357 (filed on Dec. 21, 2012), the entire disclosures of which are hereby incorporated by reference, newer systems utilize compact sensor arrangements to detect, for example, hand gestures with high accuracy but without the need for markers or other worn devices. A sensor may, for example, lie on a flat surface below the user's hands. As the user performs gestures in a natural fashion, the sensor detects the movements and changing configurations of the user's hands, and motion-capture software reconstructs these gestures for display or interpretation.

In some deployments, it may be advantageous to integrate the sensor with the display itself. For example, the sensor may be mounted within the top bezel or edge of a laptop's display, capturing user gestures above or near the keyboard. While desirable, this configuration poses considerable design challenges. As shown in FIG. 11A, the sensor's field of view $\theta$ must be angled down in order to cover the space just above the keyboard, while other use situations—e.g., where the user stands above the laptop—require the field of view $\theta$ to be angled upward. Large spaces are readily monitored by stand-alone cameras adapted for, e.g., video-conferencing; these can include gimbal mounts that permit multiple-axis rotation, enabling the camera to follow a user as she moves around. Such mounting configurations and the mechanics for controlling them are not practical, however, for the tight form factors of a laptop or flat-panel display.

Nor can wide-angle optics solve the problem of large fields of view because of the limited area of the image sensor; a lens angle of view wide enough to cover a broad region within which activity might occur would require an unrealistically large image sensor—only a small portion of which would be active at any time. For example, the angle $\phi$ between the screen and the keyboard depends on the user's preference and ergonomic needs, and may be different each time the laptop is used; and the region within which the user performs gestures—directly over the keyboard or above the laptop altogether—is also subject to change.

Accordingly, there is a need for an optical configuration enabling an image sensor, deployed within a limited volume, to operate over a wide and variable field of view.

SUMMARY

The technology disclosed relates to enhancing the fields of view of one or more cameras of a gesture recognition system for augmenting the three-dimensional (3D) sensory space of the gesture recognition system. The augmented 3D sensory space allows for inclusion of previously uncaptured of regions and points for which gestures can be interpreted i.e. blind spots of the cameras of the gesture recognition system. Some examples of such blind spots include areas underneath the cameras and/or within 20-85 degrees of a tangential axis of the cameras. In particular, the technology disclosed uses a Fresnel prismatic element and/or a triangular prism element to redirect the optical axis of the cameras, giving the cameras fields of view that cover at least 45 to 80 degrees from tangential to the vertical axis of a display screen on which the cameras are mounted.

Advantageously, some implementations can provide for improved interface with computing and/or other machinery than would be possible with heretofore known techniques. In some implementations, a richer human—machine interface experience can be provided. The following detailed description together with the accompanying drawings will provide a better understanding of the nature and advantages provided for by implementations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Gesture Recognition System

Figure 1:
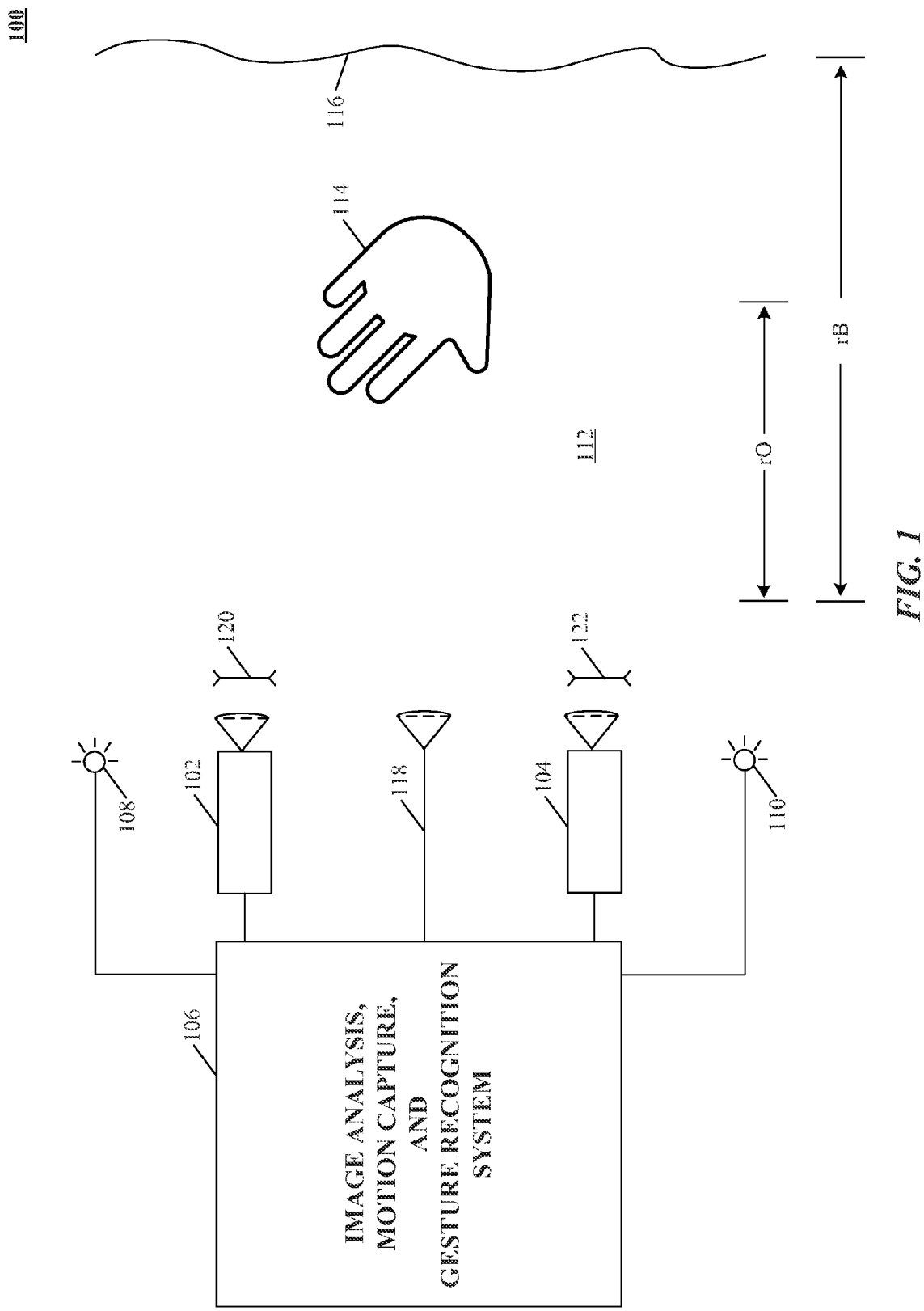
FIG. 1 illustrates an example gesture-recognition system.

Implementations of the technology disclosed relate to methods and systems for capturing motion and/or determining position of an object using small amounts of information. For example, an outline of an object's shape, or silhouette, as seen from a particular vantage point can be used to define bounding line segments to the object from that vantage point in various planes, referred to as "observation information" according to one implementation. Positions of the control object determined for different slices can be correlated to construct a 3D solid model of the object by fitting a plurality of 3D solid subcomponents to the observation information, including its position and shape. A succession of images can be analyzed using the same technique to model motion of the object. Motion of a complex object that has multiple separately articulating members (e.g., a human hand) can be modeled using techniques described herein.

The technology disclosed can be applied to solve the technical problem of reducing computational time and complexity of detecting and interpreting motions and gestures of control objects in a 3D sensory space. In one implementation, a 3D solid model is constructed based on the observation information of the control object. Further, the constructed 3D solid model is improved by a variety of techniques. In one implementation, the 3D solid model is compared with the observation information to detect an error terms or indications, which can be overcome to generate a more accurate model. In another implementation, the 3D solid model is improved by correcting the model itself and removing any impurities or spurious or discontinuous 3D model subcomponents, which may not comply with real-world physical characteristics of the control object being tracked.

In another implementation, the 3D solid model is constrained by replacing a plurality of 3D solid subcomponents of the 3D solid model with fewer representative subcomponents. In one implementation, the representative subcomponents are extreme subcomponents of the 3D solid model. For instance, for a hand, the 3D solid model can include at least three subcomponents respectively representing the proximal carpal, intermediary knuckle, and the dorsal carpal. However, the movements and interactions of the hands can be tracked by only tracking the dorsal carpal. As a result, the 3D solid model is constrained to include only the extreme subcomponent representing the dorsal carpal. This constraint 3D solid model greatly reduces the computational time and resources and thus cane be applied for motion tracking in mobile devices, according to one implementation. In yet another implementation, a plurality of 3D solid subcomponents is represented by an artificial construct rather than individual subcomponents to achieve a low-power consumption state of a device. In such an implementation, the artificial constructs are simple geometric shapes such as line segments, rectangles, circles, ellipses, etc., thus improving the efficiency and response time of the motion tracking and gesture recognition algorithm.

Implementations described herein with reference to examples can provide for automatically (e.g., programmatically) determining a correct way to interpret inputs detected from positional information (e.g., position, volume, shape, and/or surface characteristics) and/or motion information (e.g., translation, rotation, and/or other structural change) of a portion of a hand or other detectable object based upon a zone determined from the hand's (or other object's) position. Inputs can be interpreted from one or a sequence of images in conjunction with receiving input, commands, communications and/or other user-machine interfacing, gathering information about objects, events and/or actions existing or occurring within an area being explored, monitored, or controlled, and/or combinations thereof.

As shown in FIG. 1, which illustrates an exemplary motion-capture system 100 including any number of cameras 102, 104 coupled to an image analysis, motion capture, and control system 106 (The system 106 is hereinafter variably referred to as the "camera controller," "image analysis and motion capture system," the "image analysis system," the "motion capture system," "the gesture recognition system," the "control and image-processing system," the "control system," or the "image-processing system," depending on which functionality of the system is being discussed.).

Cameras 102, 104 provide digital image data to the image analysis, motion capture, and control system 106, which analyzes the image data to determine the three-dimensional (3D) position, orientation, and/or motion of the object 114 the field of view of the cameras 102, 104. Cameras 102, 104 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. To capture motion of a running person, the volume of interest might have dimensions of tens of meters in order to observe several strides.

Cameras 102, 104 can be oriented in any convenient manner. In one implementation, the optical axes of the cameras 102, 104 are parallel, but this is not required. As described below, each of the 102, 104 can be used to define a "vantage point" from which the object 114 is seen; if the location and view direction associated with each vantage point are known, the locus of points in space that project onto a particular position in the cameras' image plane can be determined. In some implementations, motion capture is reliable only for objects in an area where the fields of view of cameras 102, 104; the cameras 102, 104 can be arranged to provide overlapping fields of view throughout the area where motion of interest is expected to occur.

In some implementations, the illustrated system 100 includes one or more sources 108, 110, which can be disposed to either side of cameras 102, 104, and are controlled by image analysis and motion capture system 106. In one implementation, the sources 108, 110 are light sources. For example, the light sources can be infrared light sources, e.g., infrared light emitting diodes (LEDs), and cameras 102, 104 can be sensitive to infrared light. Use of infrared light can allow the motion-capture system 100 to operate under a broad range of lighting conditions and can avoid various inconveniences or distractions that can be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. Alternatively, cameras 102, 104 include elements sensitive to different spectral portions, e.g., visible light (RGB) and infrared (IR) radiation, and information from the different spectral portions can be processed independently, or in conjunction with one another. In another implementation, the sources 108, 110 are sonic sources providing sonic energy appropriate to one or more sonic sensors (not shown in FIG. 1 for clarity sake) used in conjunction with, or instead of, cameras 102, 104. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, which are not audible to humans.

It should be stressed that the arrangement shown in FIG. 1 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes an entire control object or its portion 114 (in this example, a hand) that can optionally hold a tool or other object of interest. Cameras 102, 104 are oriented toward the region 112 to capture video images of the hand 114. In some implementations, the operation of light sources 108, 110 and cameras 102, 104 is controlled by the image analysis and motion capture system 106, which can be, e.g., a computer system, control logic implemented in hardware and/or software or combinations thereof. Based on the captured images, image analysis and motion capture system 106 determines the position and/or motion of hand 114.

Motion capture can be improved by enhancing contrast between the object of interest 114 and background surfaces like surface 116 visible in an image, for example, by means of controlled lighting directed at the object. For instance, in motion capture system 106 where an object of interest 114, such as a person's hand, is significantly closer to the cameras 102 and 104 than the background surface 116, the falloff of light intensity with distance ($1/r^2$ for point like light sources) can be exploited by positioning a light source (or multiple light sources) near the camera(s) or other image-capture device(s) and shining that light onto the object 114. Source light reflected by the nearby object of interest 114 can be expected to be much brighter than light reflected from more distant background surface 116, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 102, 104 are oriented toward a region of interest 112 in which an object of interest 114 (in this example, a hand) and one or more background objects 116 can be present. Light sources 108, 110 are arranged to illuminate region 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, can control the operation of light sources 108, 110 and cameras 102, 104 to capture images of region 112. Based on the captured images, the image-processing system 106 determines the position and/or motion of object 114. For example, as a step in determining the position of object 114, image-analysis system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These conditions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, can emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using motion algorithms.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 (e.g., a CCD or CMOS sensor) and/or an associated imaging optic (e.g., a lens) that monitor the brightness in the region of interest 112 and detect any change in brightness. For example, a single light sensor including, e.g., a photodiode that provides an output voltage indicative of (and over a large range proportional to) a measured light intensity can be disposed between the two cameras 102, 104 and oriented toward the region of interest 112. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness can abruptly change. For example, a person walking in front of the sensor(s) 118 can block light coming from an opposing end of the room, resulting in a sudden decrease in brightness. In other situations, the person can reflect light from a light source in the room onto the sensor, resulting in a sudden increase in measured brightness.

The aperture of the sensor(s) 118 can be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change can be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods can also be used in conjunction. For example, a range of thresholds can be determined based on theoretical considerations (e.g., by physical modelling, which can include ray tracing, noise estimation, etc.), and the threshold thereafter fine-tuned within that range based on experimental observations.

In implementations where the area of interest 112 is illuminated, the sensor(s) 118 will generally, in the absence of an object in this area, only measure scattered light amounting to a small fraction of the illumination light. Once an object enters the illuminated area, however, this object can reflect substantial portions of the light toward the sensor(s) 118, causing an increase in the measured brightness. In some implementations, the sensor(s) 118 is (or are) used in conjunction with the light sources 108, 110 to deliberately measure changes in one or more environmental illumination parameters such as the reflectivity of the environment within the wavelength range of the light sources. The light sources can blink, and a brightness differential be measured between dark and light periods of the blinking cycle. If no object is present in the illuminated region, this yields a baseline reflectivity of the environment. Once an object is in the area of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 can detect an object in the region of interest 112 based on a change in one or more environmental illumination parameters such as environmental reflectivity that exceeds a predetermined threshold (e.g., by 10% or some other relative or absolute amount). As with changes in brightness, the threshold change can be set theoretically based on the configuration of the image-capture system and the monitored space as well as the expected objects of interest, and/or experimentally based on observed changes in reflectivity.

Computer System

Figure 2:
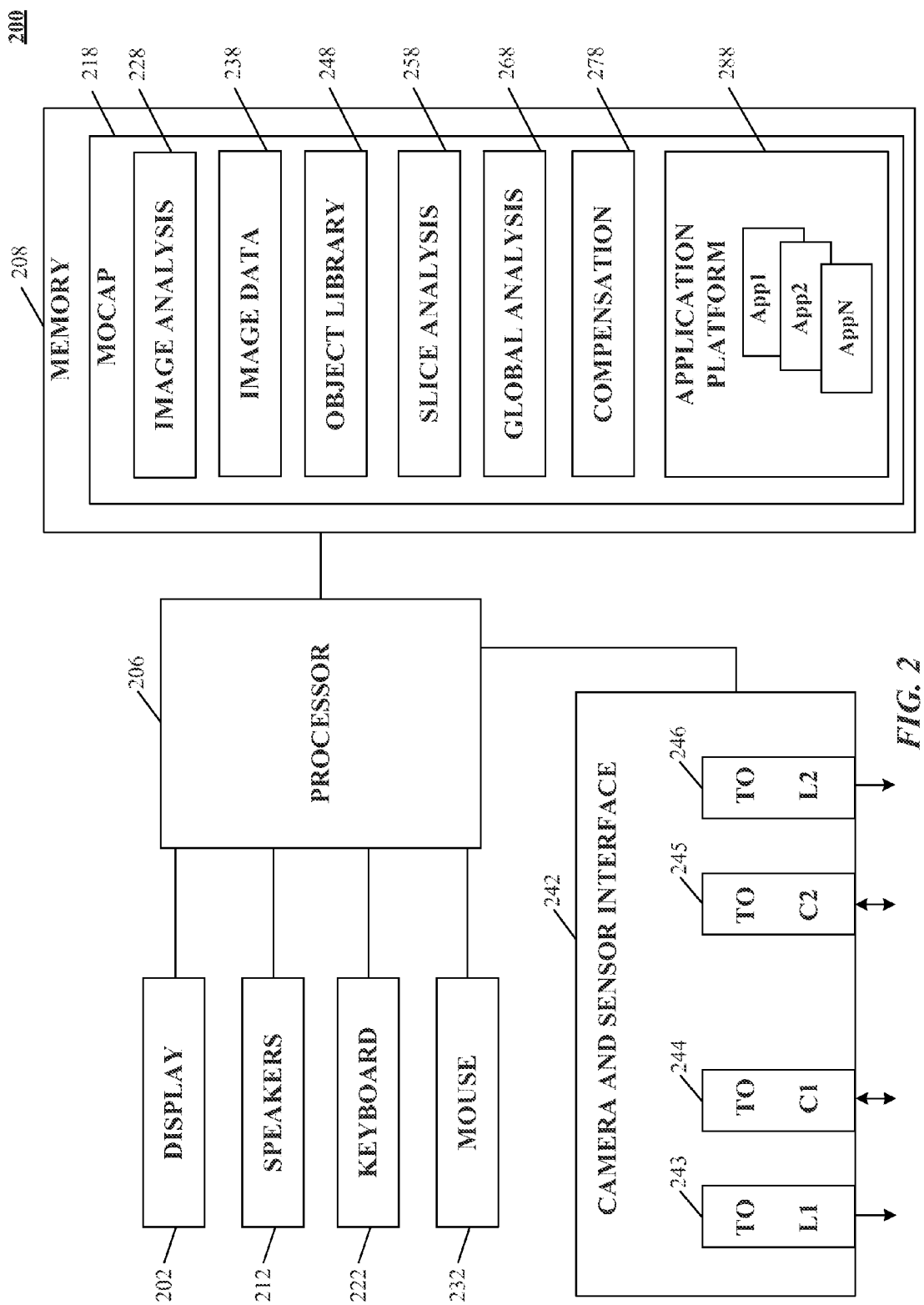
FIG. 2 is a simplified block diagram of a computer system implementing a gesture-recognition apparatus according to an implementation of the technology disclosed.

FIG. 2 is a simplified block diagram of a computer system 200, implementing all or portions of image analysis and motion capture system 106 according to an implementation of the technology disclosed. Image analysis and motion capture system 106 can include or consist of any device or device component that is capable of capturing and processing image data. In some implementations, computer system 200 includes a processor 206, memory 208, a sensor interface 242, a display 202 (or other presentation mechanism(s)), e.g. holographic projection systems, wearable googles or other head mounted displays (HMDs), heads up displays (HUDs), other visual presentation mechanisms or combinations thereof, speakers 212, a keyboard 222, and a mouse 232. Memory 208 can be used to store instructions to be executed by processor 206 as well as input and/or output data associated with execution of the instructions. In particular, memory 208 contains instructions, conceptually illustrated as a group of modules described in greater detail below, that control the operation of processor 206 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

According to some implementations, cameras 102, 104 and/or light sources 108, 110 can connect to the computer 200 via a universal serial bus (USB), FireWire, or other cable, or wirelessly via Bluetooth, Wi-Fi, etc. The computer 200 can include a camera interface 242, implemented in hardware (e.g., as part of a USB port) and/or software (e.g., executed by processor 206) that enables communication with the cameras 102, 104 and/or light sources 108, 110. The camera interface 242 can include one or more data ports and associated image buffers for receiving the image frames from the cameras 102, 104; hardware and/or software signal processors to modify the image data (e.g., to reduce noise or reformat data) prior to providing it as input to a motion-capture or other image-processing program; and/or control signal ports for transmit signals to the cameras 102, 104, e.g., to activate or deactivate the cameras, to control camera settings (frame rate, image quality, sensitivity, etc.), or the like.

Processor 206 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera and sensor interface 242 can include hardware and/or software that enables communication between computer system 200 and cameras such as cameras 102, 104 shown in FIG. 1, as well as associated light sources such as light sources 108, 110 of FIG. 1. Thus, for example, camera and sensor interface 242 can include one or more data ports 244, 245 to which cameras can be connected, as well as hardware and/or software signal processors to modify data signals received from the cameras (e.g., to reduce noise or reformat data) prior to providing the signals as inputs to a motion-capture ("mocap") program 218 executing on processor 206. In some implementations, camera and sensor interface 242 can also transmit signals to the cameras, e.g., to activate or deactivate the cameras, to control camera settings (frame rate, image quality, sensitivity, etc.), or the like. Such signals can be transmitted, e.g., in response to control signals from processor 206, which can in turn be generated in response to user input or other detected events.

Camera and sensor interface 242 can also include controllers 243, 246, to which light sources (e.g., light sources 108, 110) can be connected. In some implementations, controllers 243, 246 provide operating current to the light sources, e.g., in response to instructions from processor 206 executing mocap program 218. In other implementations, the light sources can draw operating current from an external power supply, and controllers 243, 246 can generate control signals for the light sources, e.g., instructing the light sources to be turned on or off or changing the brightness. In some implementations, a single controller can be used to control multiple light sources.

Instructions defining mocap program 218 are stored in memory 208, and these instructions, when executed, perform motion-capture analysis on images supplied from cameras connected to sensor interface 242. In one implementation, mocap program 218 includes various modules, such as an image analysis module 228 or image data 238. Image analysis module 228 can analyze images (e.g., images captured via camera and sensor interface 242) to detect edges and/or features of an object therein and/or other information about the object's location. In one implementation, it can also analyze the object information to determine the 3D position and/or motion of the object (e.g., a user's hand). Slice analysis module 258 can analyze image data from a slice of an image as described below, to generate an approximate cross-section of the object in a particular plane. Global analysis module 268 can correlate cross-sections across different slices and refine the analysis. Examples of operations that can be implemented in code modules of mocap program 218 are described below. Examples of operations that can be implemented in code modules of mocap program 218 are described below.

The memory 208 can further store input and/or output data associated with execution of the instructions (including, e.g., input and output image data 238) as well as additional information used by the various software applications; for example, in some implementations, the memory 208 stores an object library 248 of canonical models of various objects of interest. As described below, an object detected in the camera images can be identified by matching its shape to a model in the object library 248, and the model can then inform further image analysis, motion prediction, etc.

The memory 208 can further store input and/or output data associated with execution of the instructions (including, e.g., input and output image data 238) as well as additional information used by the various software applications. In addition, the memory 208 can also include other information and/or code modules used by mocap program 218 such as a compensation module 278 and an application platform 288. The compensation module 278 compensates for redirection of the optical axes of the cameras 120, 122 caused by the Fresnel prismatic element due to its non-uniform prism pitch. In one implementation, this can be achieved by collecting the redirected optical axes on an intraocular lens. In another implementation, this can be achieved by applying at least one of an amplification function, polynomial function, transcendental function, and a step function to the frame data captured using the optical axes. The application platform 288 allows a user to interact with the mocap program 218 using different applications like application 1 (App1), application 2 (App2), and application N (AppN).

Display 202, speakers 212, keyboard 222, and mouse 232 can be used to facilitate user interaction with computer system 200. In some implementations, results of motion capture using sensor interface 242 and mocap program 218 can be interpreted as user input. For example, a user can perform hand gestures that are analyzed using mocap program 218, and the results of this analysis can be interpreted as an instruction to some other program executing on processor 206 (e.g., a web browser, word processor, or other application). Thus, by way of illustration, a user might use upward or downward swiping gestures to "scroll" a webpage currently displayed on display 202, to use rotating gestures to increase or decrease the volume of audio output from speakers 212, and so on.

It will be appreciated that computer system 200 is illustrative and that variations and modifications are possible. Computer systems can be implemented in a variety of form factors, including server systems, desktop systems, laptop systems, tablets, smartphones or personal digital assistants, wearable devices, e.g., goggles, head mounted displays (HMDs), wrist computers, heads up displays (HUDs) for vehicles, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

In another example, in some implementations, the cameras 102, 104 are connected to or integrated with a special-purpose processing unit that, in turn, communicates with a general-purpose computer, e.g., via direct memory access ("DMA"). The processing unit can include one or more image buffers for storing the image data read out from the camera sensors, a GPU or other processor and associated memory implementing at least part of the motion-capture algorithm, and a DMA controller. The processing unit can provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

When a user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the mocap 218, which provides input to an electronic device, allowing a user to remotely control the electronic device and/or manipulate virtual objects, such as prototypes/models, blocks, spheres, or other shapes, buttons, levers, or other controls, in a virtual environment displayed on display 202. The user can perform the gesture using any part of her body, such as a finger, a hand, or an arm. As part of gesture recognition or independently, the image analysis and motion capture system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 206 may not only recognize gestures for purposes of providing input to the electronic device, but can also capture the position and shape of the user's hand in consecutive video images in order to characterize the hand gesture in 3D space and reproduce it on the display screen 202.

In one implementation, the mocap 218 compares the detected gesture to a library of gestures electronically stored as records in a database, which is implemented in the image analysis and motion capture system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently. Typically, the trajectory of a sensed gesture is mathematically compared against the stored trajectories to find a best match, and the gesture is recognized as corresponding to the located database entry only if the degree of match exceeds a threshold. The vector can be scaled so that, for example, large and small arcs traced by a user's hand will be recognized as the same gesture (i.e., corresponding to the same database record) but the gesture recognition module will return both the identity and a value, reflecting the scaling, for the gesture. The scale can correspond to an actual gesture distance traversed in performance of the gesture, or can be normalized to some canonical distance.

In various implementations, the motion captured in a series of camera images is used to compute a corresponding series of output images for presentation on the display 202. For example, camera images of a moving hand can be translated by the processor 206 into a wire-frame or other graphical representations of motion of the hand. In any case, the output images can be stored in the form of pixel data in a frame buffer, which can, but need not be, implemented, in main memory 208. A video display controller reads out the frame buffer to generate a data stream and associated control signals to output the images to the display 202. The video display controller can be provided along with the processor 206 and memory 208 on-board the motherboard of the computer 200, and can be integrated with the processor 206 or implemented as a co-processor that manipulates a separate video memory.

In some implementations, the computer 200 is equipped with a separate graphics or video card that aids with generating the feed of output images for the display 202. The video card generally includes a graphical processing unit ("GPU") and video memory, and is useful, in particular, for complex and computationally expensive image processing and rendering. The graphics card can implement the frame buffer and the functionality of the video display controller (and the on-board video display controller can be disabled). In general, the image-processing and motion-capture functionality of the system 200 can be distributed between the GPU and the main processor 206.

In some implementations, the mocap program 218 detects more than one gesture. The user can perform an arm-waving gesture while flexing his or her fingers. The mocap program 218 detects the waving and flexing gestures and records a waving trajectory and five flexing trajectories for the five fingers. Each trajectory can be converted into a vector along, for example, six Euler degrees of freedom in Euler space. The vector with the largest magnitude can represent the dominant component of the motion (e.g., waving in this case) and the rest of vectors can be ignored. In one implementation, a vector filter that can be implemented using conventional filtering techniques is applied to the multiple vectors to filter the small vectors out and identify the dominant vector. This process can be repetitive, iterating until one vector—the dominant component of the motion—is identified. In some implementations, a new filter is generated every time new gestures are detected.

If the mocap program 218 is implemented as part of a specific application (such as a game or controller logic for a television), the database gesture record can also contain an input parameter corresponding to the gesture (which can be scaled using the scaling value); in generic systems where the mocap program 218 is implemented as a utility available to multiple applications, this application-specific parameter is omitted: when an application invokes the mocap program 218, it interprets the identified gesture according in accordance with its own programming.

In one implementation, the mocap program 218 breaks up and classifies one or more gestures into a plurality of gesture primitives. Each gesture can include or correspond to the path traversed by an object, such as user's hand or any other object (e.g., an implement such as a pen or paintbrush that the user holds), through 3D space. The path of the gesture can be captured by the cameras 102, 104 in conjunction with mocap 218, and represented in the memory 208 as a set of coordinate (x, y, z) points that lie on the path, as a set of vectors, as a set of specified curves, lines, shapes, or by any other coordinate system or data structure. Any method for representing a 3D path of a gesture on a computer system is within the scope of the technology disclosed.

Of course, the system 200 under control need not be a desktop computer. In other implementations, free-space gestures can be used to operate a handheld tablet or smartphone. The tablet can be connected, e.g., via a USB cable (or any other wired or wireless connection), to a motion-capture device (such as for example, a dual-camera motion controller as provided by Leap Motion, Inc., San Francisco, Calif. or other interfacing mechanisms and/or combinations thereof) that is positioned and oriented so as to monitor a region where hand motions normally take place. For example, the motion-capture device can be placed onto a desk or other working surface, and the tablet can be held at an angle to that working surface to facilitate easy viewing of the displayed content. The tablet can be propped up on a tablet stand or against a wall or other suitable vertical surface to free up the second hand, facilitating two-hand gestures. In a modified tablet implementation, the motion-capture device can be integrated into the frame of the tablet or smartphone.

Portable Electronic Devices

Figure 3:
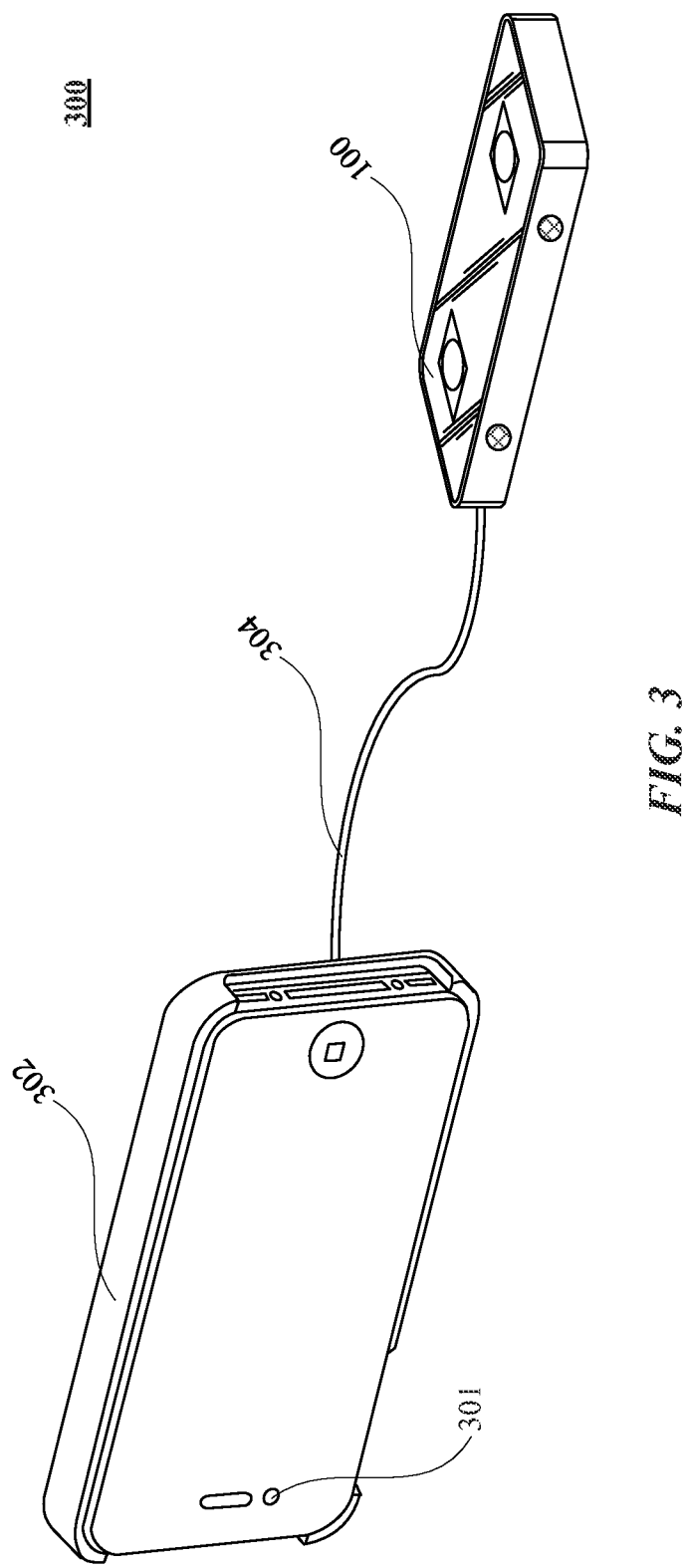
FIG. 3 illustrates one implementation of a camera controller peripherally connected to a smartphone with at least one of a Fresnel prismatic element and/or a triangular solid prism or a combination thereof.

FIG. 3 illustrates one implementation 300 of a camera controller 100 peripherally connected via data cable 304 to a smartphone 302 with at least one of a Fresnel prismatic element 301 and/or a triangular solid prism 301 or a combination thereof.

Figure 4:
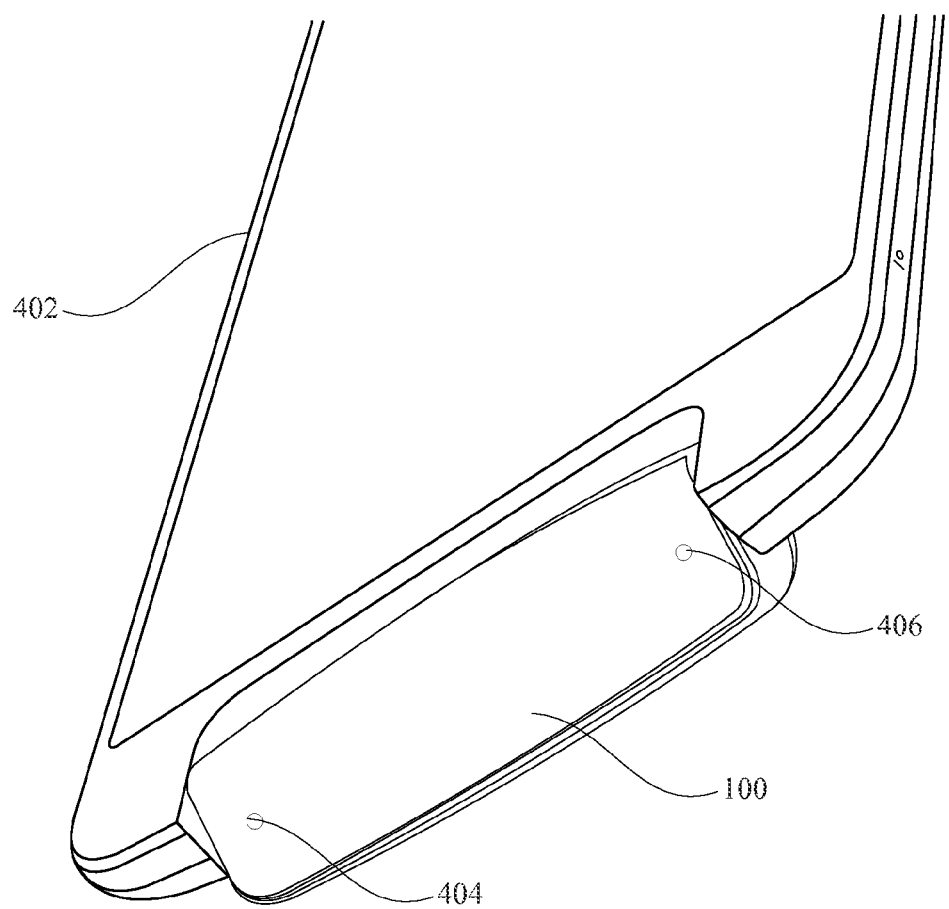
FIG. 4 illustrates one implementation of a camera controller embedded in a swivel camera of a smartphone with at least one of a Fresnel prismatic element and/or a triangular solid prism or a combination thereof.

FIG. 4 illustrates one implementation 400 of a camera controller 100 embedded in a swivel camera of a smartphone 402 with at least one of a Fresnel prismatic element 404 and/or a triangular solid prism 404 or a combination thereof. In other implementations, smartphone 402 includes another camera 406 to which the Fresnel prismatic element 404 and/or the triangular solid prism 404 are not applied.

Figure 5:
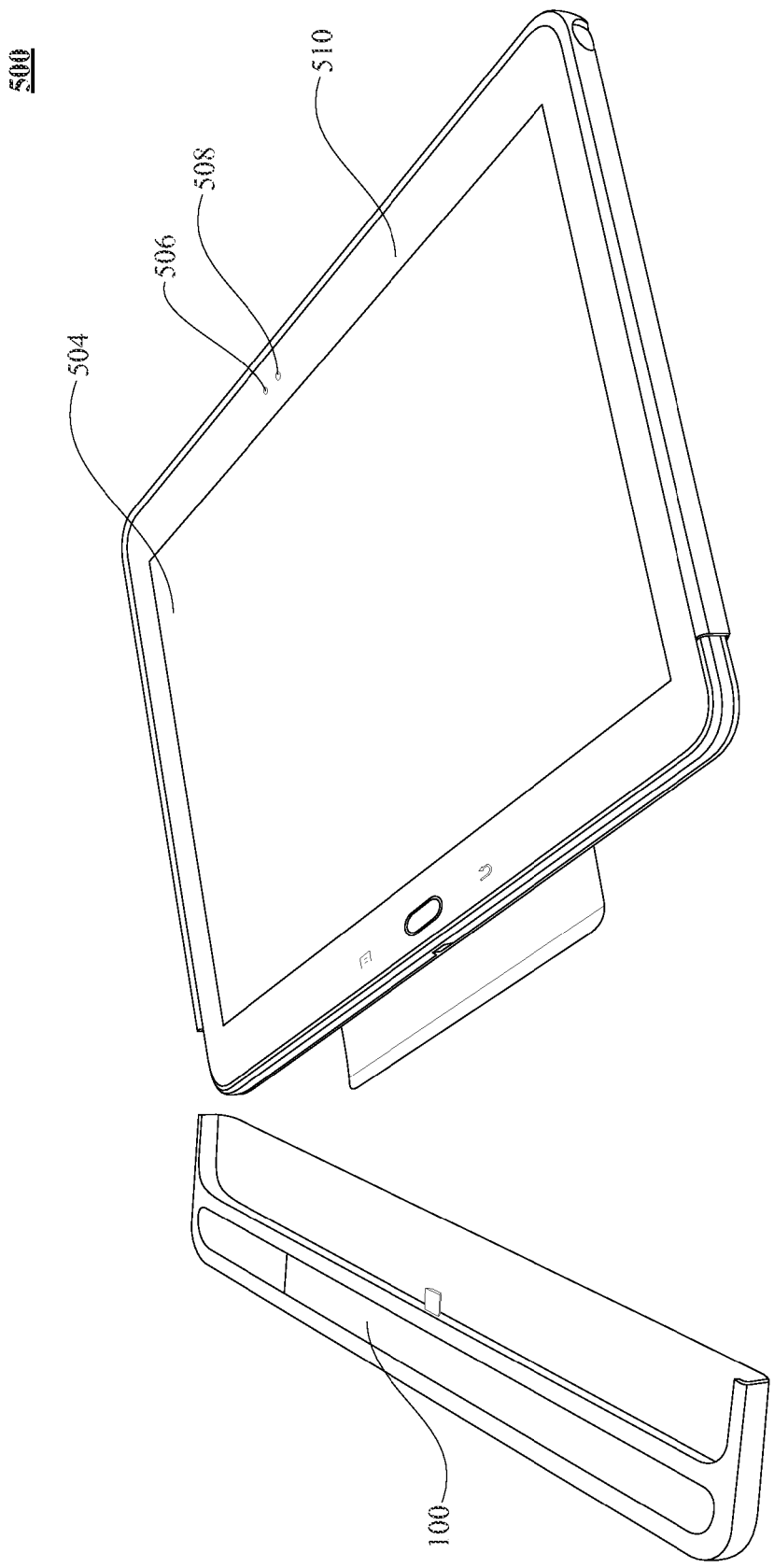
FIG. 5 illustrates one implementation of a camera controller embedded in a keyboard-less tablet case of a computer tablet with at least one of a Fresnel prismatic element and/or a triangular solid prism or a combination thereof.

FIG. 5 illustrates one implementation 500 of a camera controller 100 embedded in a keyboard-less tablet case of a computer tablet 510 with at least one of a Fresnel prismatic element 508 and/or a triangular solid prism 506 or a combination thereof. In one implementation, the Fresnel prismatic element 508 and/or the triangular solid prism 506 are applied to a camera mounted on the rim or bezel of the display 504. In other implementations, computer tablet 510 includes another camera 506 to which the Fresnel prismatic element 508 and/or the triangular solid prism 508 are not applied.

Figure 6:
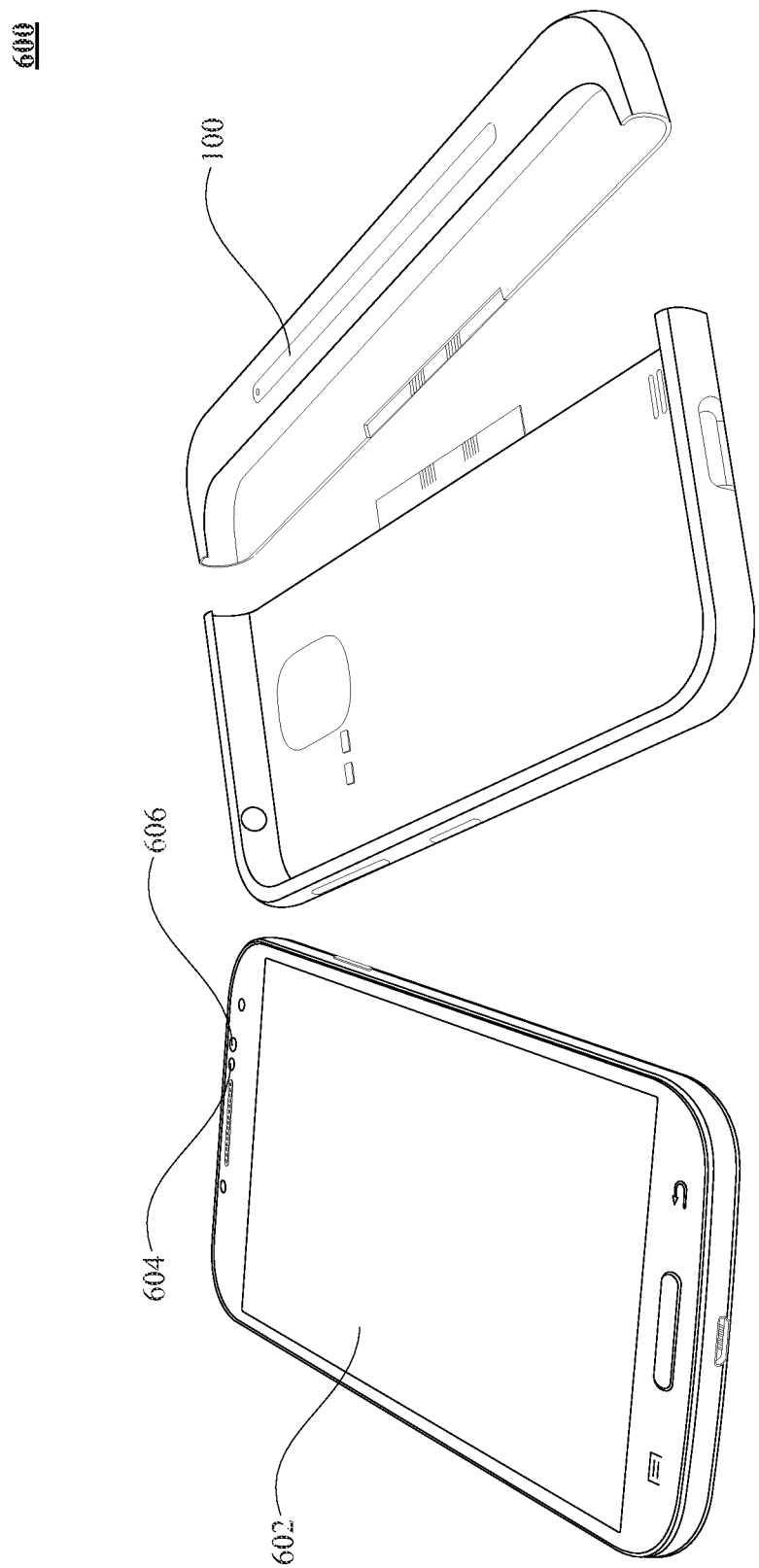
FIG. 6 illustrates one implementation of a camera controller embedded in a portrait mobile case of a smartphone with at least one of a Fresnel prismatic element and/or a triangular solid prism or a combination thereof.

FIG. 6 illustrates one implementation 600 of a camera controller 100 embedded in a portrait mobile case of a smartphone 602 with at least one of a Fresnel prismatic element 606 and/or a triangular solid prism 606 or a combination thereof. In other implementations, smartphone 602 includes another camera 604 to which the Fresnel prismatic element 606 and/or the triangular solid prism 606 are not applied.

Figure 7:
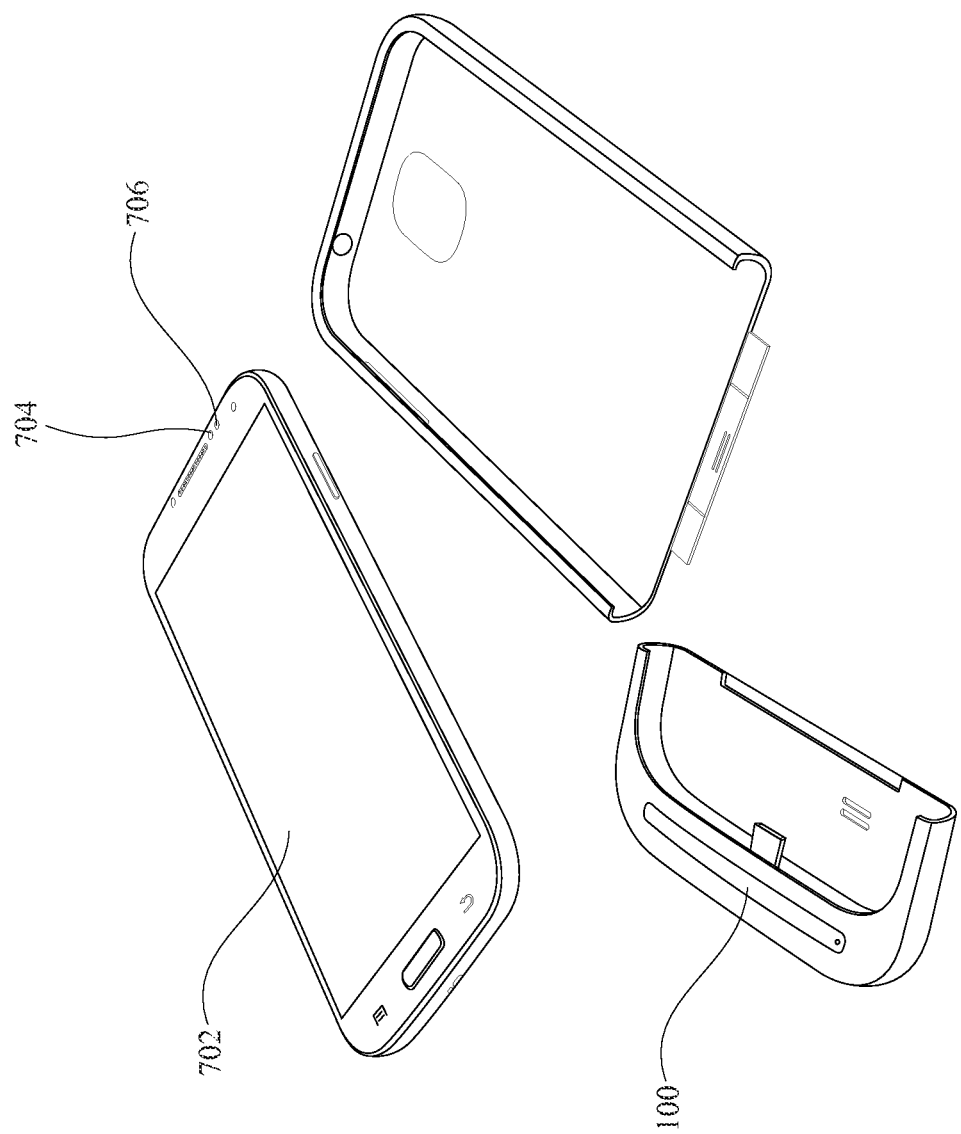
FIG. 7 illustrates one implementation of a camera controller embedded in a landscape mobile case of a smartphone with at least one of a Fresnel prismatic element and/or a triangular solid prism or a combination thereof.
Figure 8:
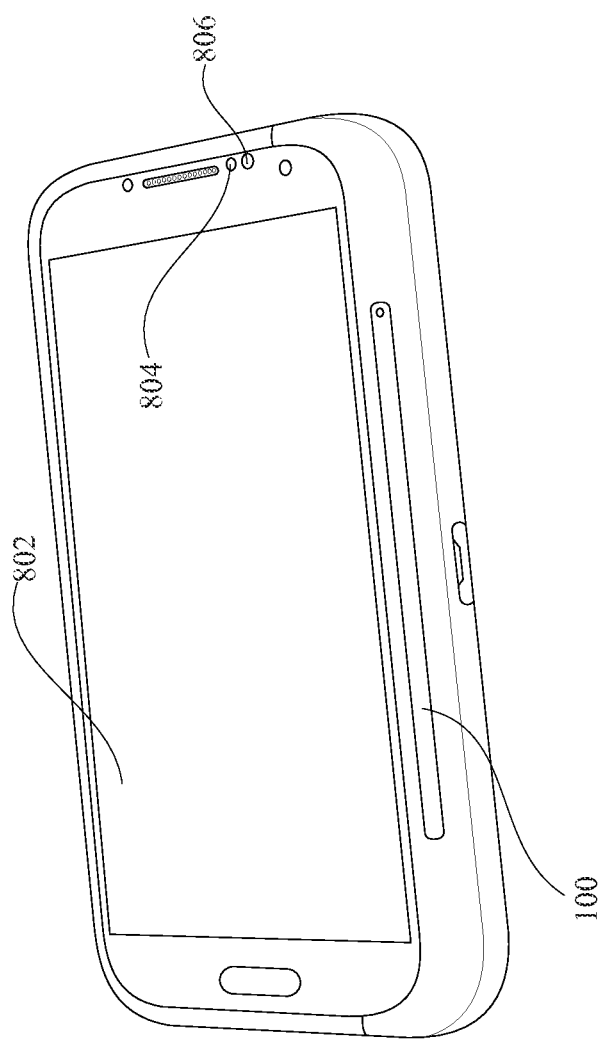
FIG. 8 illustrates one implementation of a camera controller embedded in a mobile case of a smartphone with at least one of a Fresnel prismatic element and/or a triangular solid prism or a combination thereof.

FIG. 7 illustrates one implementation of a camera controller 100 embedded in a landscape mobile case of a smartphone 702 with at least one of a Fresnel prismatic element 706 and/or a triangular solid prism 706 or a combination thereof. In other implementations, smartphone 702 includes another camera 704 to which the Fresnel prismatic element 706 and/or the triangular solid prism 706 are not applied. FIG. 8 illustrates one implementation 800 of a camera controller 100 embedded in a mobile case of a smartphone 802 with at least one of a Fresnel prismatic element 806 and/or a triangular solid prism 806 or a combination thereof. In other implementations, smartphone 802 includes another camera 804 to which the Fresnel prismatic element 806 and/or the triangular solid prism 806 are not applied.

Figure 9A:
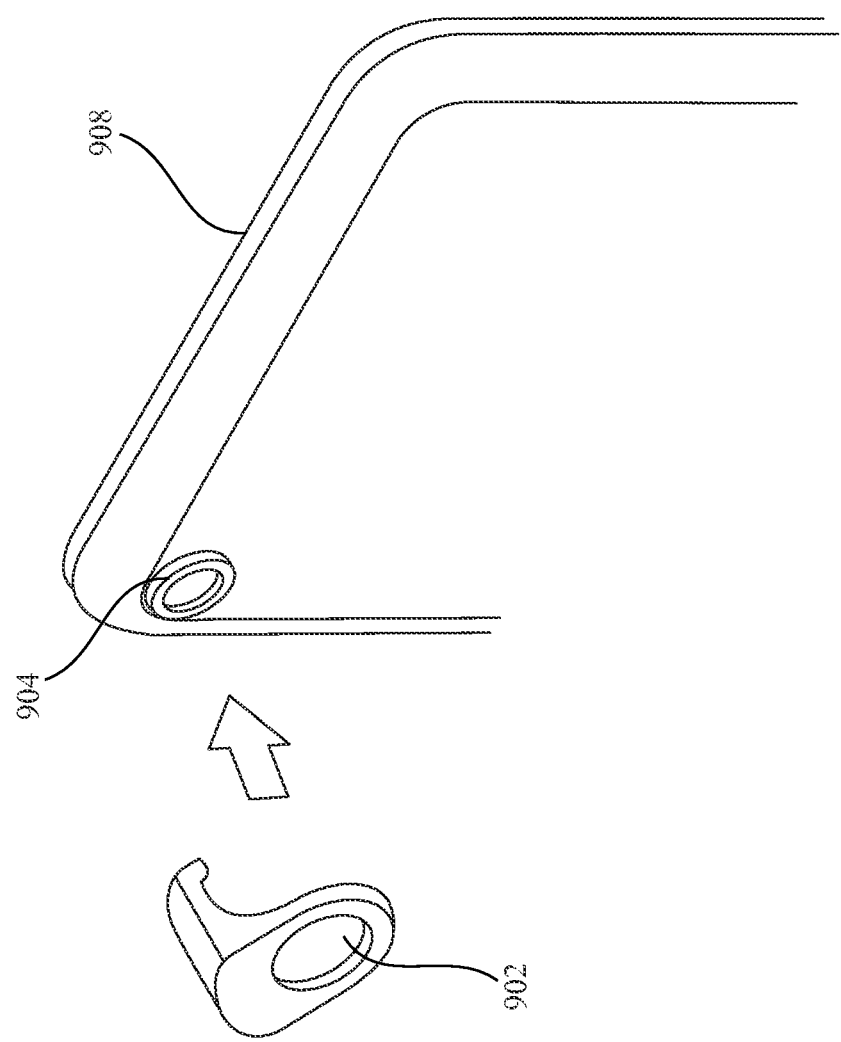
FIG. 9A illustrates one implementation of a smartphone with removable Fresnel prismatic element and/or a triangular solid prism or a combination thereof.

FIG. 9A illustrates one implementation of a smartphone 908 with removable Fresnel prismatic element 902 and/or a triangular solid prism 902 or a combination thereof attached to a camera 904 of the smartphone 908. In some implementations, the removable Fresnel prismatic element 902 and/or a triangular solid prism 902 can be conformal to the camera 904.

Bender

Figure 9B:
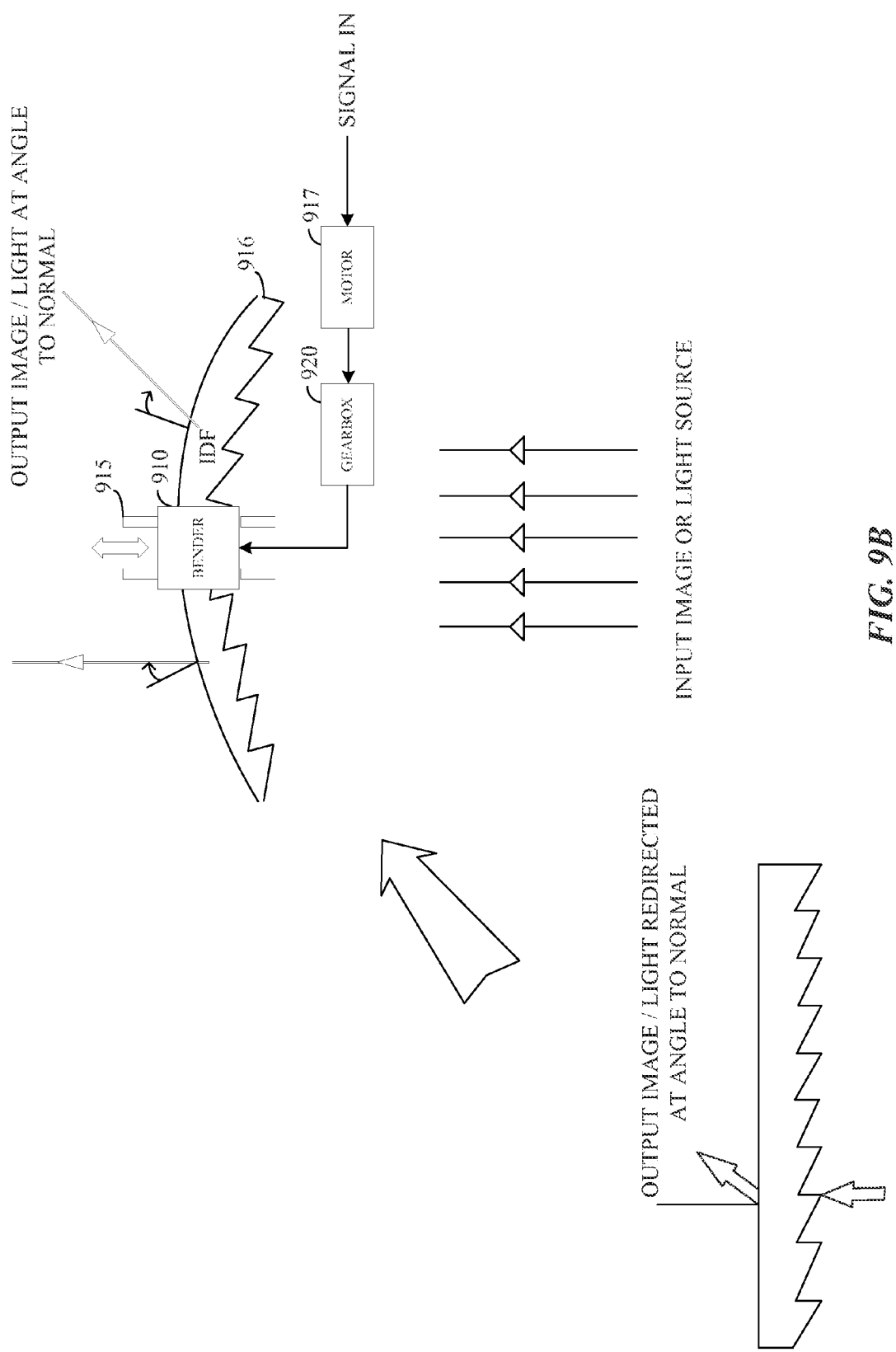
FIG. 9B illustrate various configurations for translating image directing film (IDF) along a translation axis T.

FIG. 9B illustrate various configurations for translating image directing film (IDF) 916 along a translation axis T. In a laptop, T will typically be vertical—i.e., along a line spanning and perpendicular to the top and bottom edges of the display 202 and lying substantially in the plane of the display 202—but can be along any desired angle depending on the application. In FIG. 9B, the IDF 916 is retained within a bender 910 that travels along one or more rails 915. In some implementations, the rail is frictional (i.e., allows bender 910 to move therealong but with enough resistance to retain the bender 910 in any desired position). In other implementations, the system includes an activatable forcing device for bidirectionally translating the mount along the guide. In the implementation shown in FIG. 9B, bender 910 is translated along rails 915 by a motor 917 (e.g., a stepper motor) 920 whose output is applied to bender 910 via a suitable gearbox 920. Deactivation of motor 917 retains bender 910 in the position attained when deactivation occurs, so the rails 915 need not be frictional. Operation of motor 917 is governed by a processor as described in detail below.

In the other implementations, one or more piezo elements are operated to move the bender 910 along the rails 915. The piezo elements apply a directional force to bender 910 upon in response to a voltage. Although piezo actuators are capable of moving large masses, the distances over which they act tend to be small. Accordingly, a mechanism (such as a lever arrangement) to amplify the traversed distance may be employed. In the illustrated implementation, the piezo elements receive voltages of opposite polarities so that one element contracts while the other expands. These voltages are applied directly by a processor or by a driver circuit under the control of a processor.

In some other implementations, a permanent magnet can be affixed to bender 910 and along with an electromagnet, which is energized by a conventional driver circuit controlled by a processor. By energizing the electromagnet so that like poles of both magnets face each other, the lens bender 910 will be pushed away until the electromagnet is de-energized, and bender 910 will retain its position due to the friction rails. To draw the bender 910 in the opposite direction, electromagnet is energized with current flowing in the opposite direction so that it attracts permanent magnet.

In further implementations, the guide is a grooved channel within a longitudinal bearing fixture. In this case, bender 910 has a ridge that slides within channel. As illustrated, ridge may flare into flanges that retain bender 910 within complementary recesses in fixture as the mount slides within the recessed channel of fixture. Although specific implementations of the mount and guide have been described, it will be appreciated by those skilled in the art that numerous mechanically suitable alternatives are available and within the scope of the technology disclosed.

Fresnel Prismatic Element

Figure 10A:
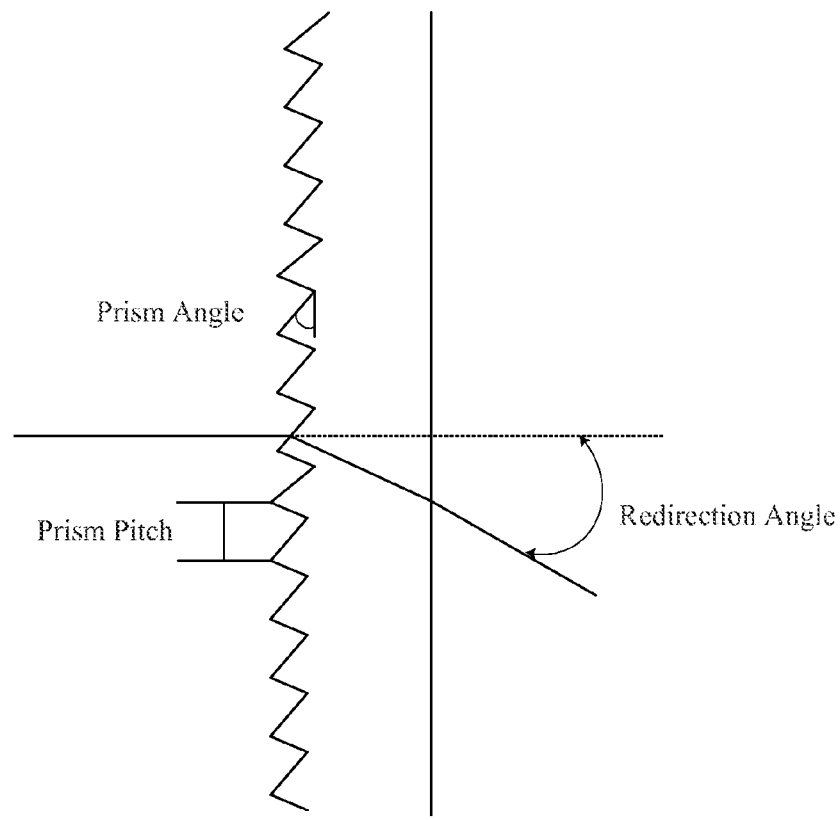
FIG. 10A illustrates one implementation of workings of a Fresnel prismatic element.

FIG. 10A illustrates one implementation of workings of a Fresnel prismatic element 1000A. Fresnel prismatic element 1000A serves as a linear array of prism elements and each of the plurality of Fresnel prisms have a refractive surface for refracting a light ray emitted from a light emitting body such as a single pixel LED or multi-pixel camera. Fresnel prismatic element 1000A can be of various types such as a Fresnel Rhombs element or a Fresnel Biprism element. As shown in FIG. 10A, Fresnel prismatic element 1000A has a saw tooth like structure that can deviate a beam of light by a specified angle referred to as "prism angle." In some implementations, the different light rays are bent at different angles depending on the different prism angles of the Fresnel prismatic element 1000A. In other implementations, the dispersed light rays are focused on to a detector by a set of lenses.

In one implementation, the distance between two peaks of consecutive saw structures defines a "prism pitch" of the Fresnel prismatic element 1000A. In some implementations, the Fresnel prismatic element 1000A is included in the structured surface of an optical film or other optical body. In other implementation, the Fresnel prismatic element 1000A is included in a membrane adapted to be pressed onto a lens of a camera. In yet another implementation, the Fresnel prismatic element 1000A can be applied to the camera controller or motion-capture device 100, such as for example, a dual-camera motion controller as provided by Leap Motion, Inc., San Francisco, Calif. or other interfacing mechanisms and/or combinations thereof) that is positioned and oriented so as to monitor a region where hand motions normally take place. In other implementations, it can be applied using a substrate backing made of a material such as modified acrylic resin polyester.

In one implementation, the redirection of the light by the Fresnel prismatic element 1000A is represented by the following Fresnel's formulas assuming that the incident angle of the light is θi and the refraction angle is θt.

$$Rp = \tan 2(\theta i - \theta t)/\tan 2(\theta i + \theta t) \quad (2)$$

$$Rs = \sin 2(\theta i - \theta t)/\sin 2(\theta i + \theta t) \quad (3)$$

$$R = 1/2(Rp + Rs) \quad (4)$$

In the formula above Rp is the reflectance of horizontally polarized light), Rs is the reflectance of vertically polarized light, and R is the reflectance of natural polarized light. The relationship between the incident angle θi and the refraction angle θt is represented by the following equation from Snell laws of refraction assuming that the refractive index of air is ni and the refractive index of an optical medium is nt.

$$ni \cdot \sin \theta i = nt \cdot \sin \theta t \quad (5)$$

Triangular Solid Prism

Figure 10B:
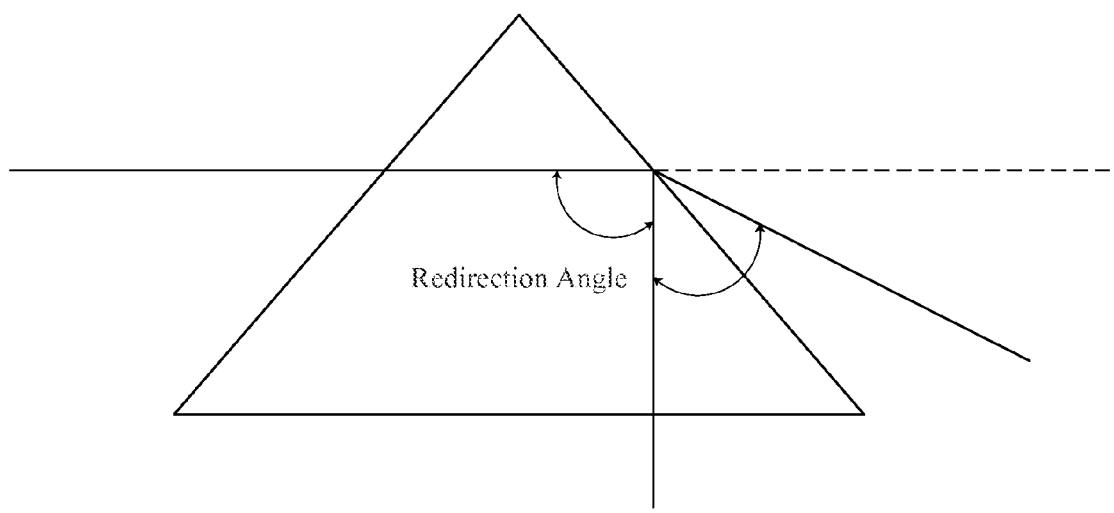
FIG. 10B illustrates one implementation of workings of a triangular solid prism.

FIG. 10B illustrates one implementation of workings of a triangular solid prism 1000B. Triangular solid prism 1000B includes an incident surface, an emergent surface, and a bottom surface. Triangular solid prism 1000B refracts the light rays received according to a deviation angle. In one implementation, prism 1000B can be of a different type such as a Pellin-Brocca prism. In some implementations, the triangular solid prism 1000B is included in the structured surface of an optical film or other optical body. In other implementation, the triangular solid prism 1000B is included in a membrane adapted to be pressed onto a lens of a camera. In yet another implementation, the triangular solid prism 1000B can be applied to the camera controller or motion-capture device 100, such as for example, a dual-camera motion controller as provided by Leap Motion, Inc., San Francisco, Calif. or other interfacing mechanisms and/or combinations thereof) that is positioned and oriented so as to monitor a region where hand motions normally take place. In other implementations, it can be applied using a substrate backing made of a material such as modified acrylic resin polyester.

Figure 11A:
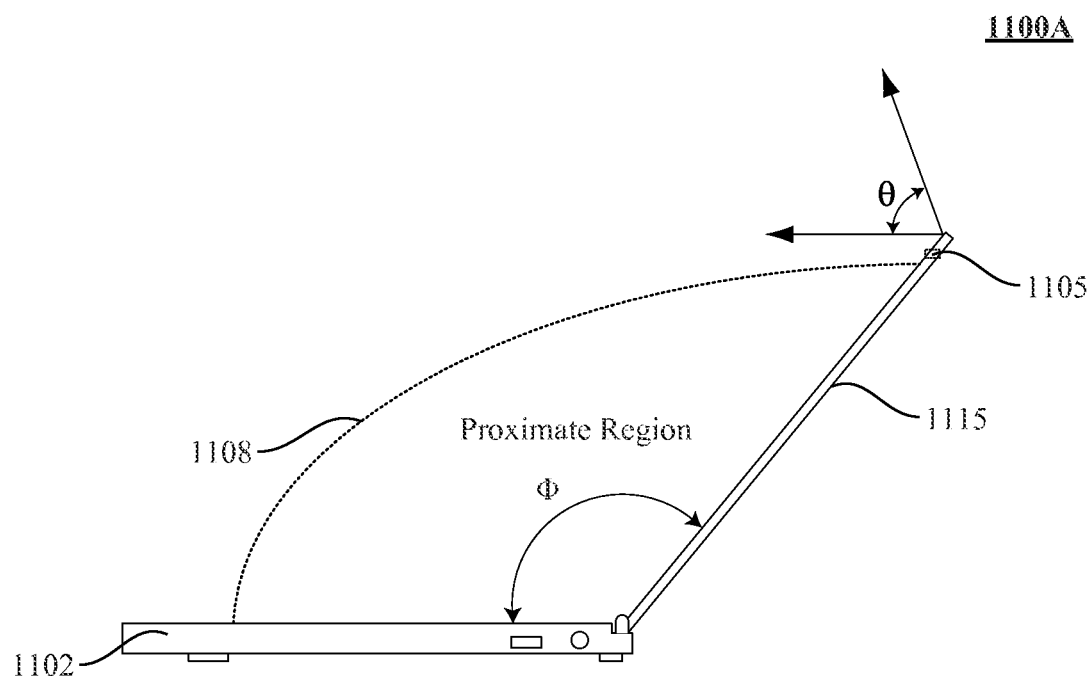
FIG. 11A shows a side elevation of a laptop computer, which can include an implementation of the technology disclosed.
Figure 11B:
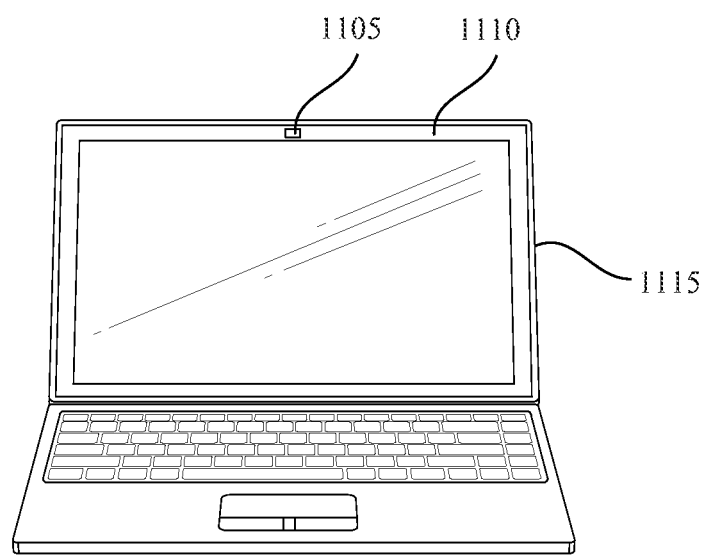
FIG. 11B is perspective front view of the laptop shown in FIG. 11A and including an implementation of the technology disclosed.

FIG. 11A shows a side elevation of a laptop computer 1102, which can include an implementation 1100A of the technology disclosed. FIG. 11B is perspective front view of the laptop 1102 shown in FIG. 11A and including an implementation 1100A of the technology disclosed. Refer first to FIGS. 11A and 11B, which illustrate both the environment in which the technology may be deployed as well as the problem that the technology addresses. A laptop computer 1102 includes a sensor arrangement 1105 in a top bezel or edge 1110 of a display 1115. Sensor arrangement 1105 includes a conventional image sensor—i.e., a grid of light-sensitive pixels—and a focusing lens or set of lenses that focuses an image onto the image sensor. Sensor arrangement 1105 may also include one or more illumination sources, and must have a limited depth to fit within the thickness of display 1115. As shown in FIG. 11A, if sensor arrangement 1105 were deployed with a fixed field of view, the coverage of its angle of view θ relative to the space in front of the laptop 1102 would depend strongly on the angle φ, i.e., where the user has positioned the display 1115. Implementations of the technology disclosed allow the field of view defined by the angle θ to be angled relative to the display 1115 typically around the horizontal axis of display 1115, but depending on the application, rotation around another (e.g., vertical) axis may be provided. (The angle θ is assumed to be fixed; it is the field of view itself, i.e., the space within the angle θ, that is itself angled relative to the display.)

Figure 12:
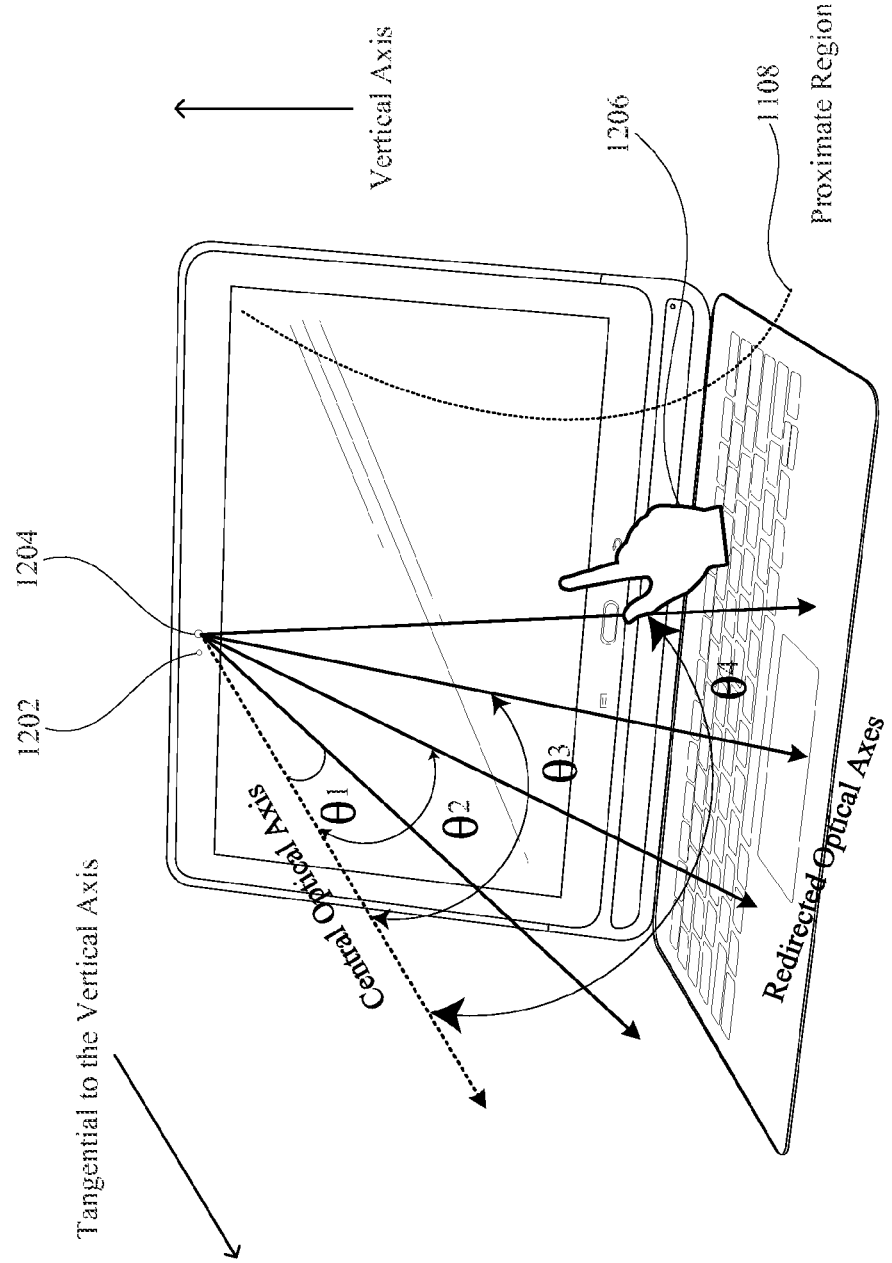
FIG. 12 depicts one implementation of a Fresnel prismatic element and/or a triangular solid prism redirecting one or more optical axes of one or more cameras of the laptop shown in FIGS. 11A-B.

FIG. 12 depicts one implementation 1200 of a Fresnel prismatic element 1204 and/or a triangular solid prism 1204 redirecting one or more optical axes of one or more cameras 1204 of the laptop 1102 shown in FIGS. 11A-B. In FIG. 12, the Fresnel prismatic element 1204 and/or the triangular solid prism 1204 redirect the optical axes of the camera 1204 that are originally within 20 degrees of the tangential to the vertical axis. In different implementations, the optical axes are redirected to different angles ♦1-♦4 ranging from 20 degrees to 85 degrees. This enhances the field of view of the camera 1204 and augments the 3D sensor spaces in which it can detect gestures 1206 performed across regions or points 1108 proximate to the display 1115 of the laptop 1102. In one implementation, range of the proximate regions or points relative to the display is user definable. In other implementations, laptop 1102 includes another camera 1202 to which the Fresnel prismatic element 1204 and/or the triangular solid prism 1204 are not applied and thus, it captures gestures performed across regions or points other than regions or points 1108 proximate to the display 1115 of the laptop 1102.

Figure 13:
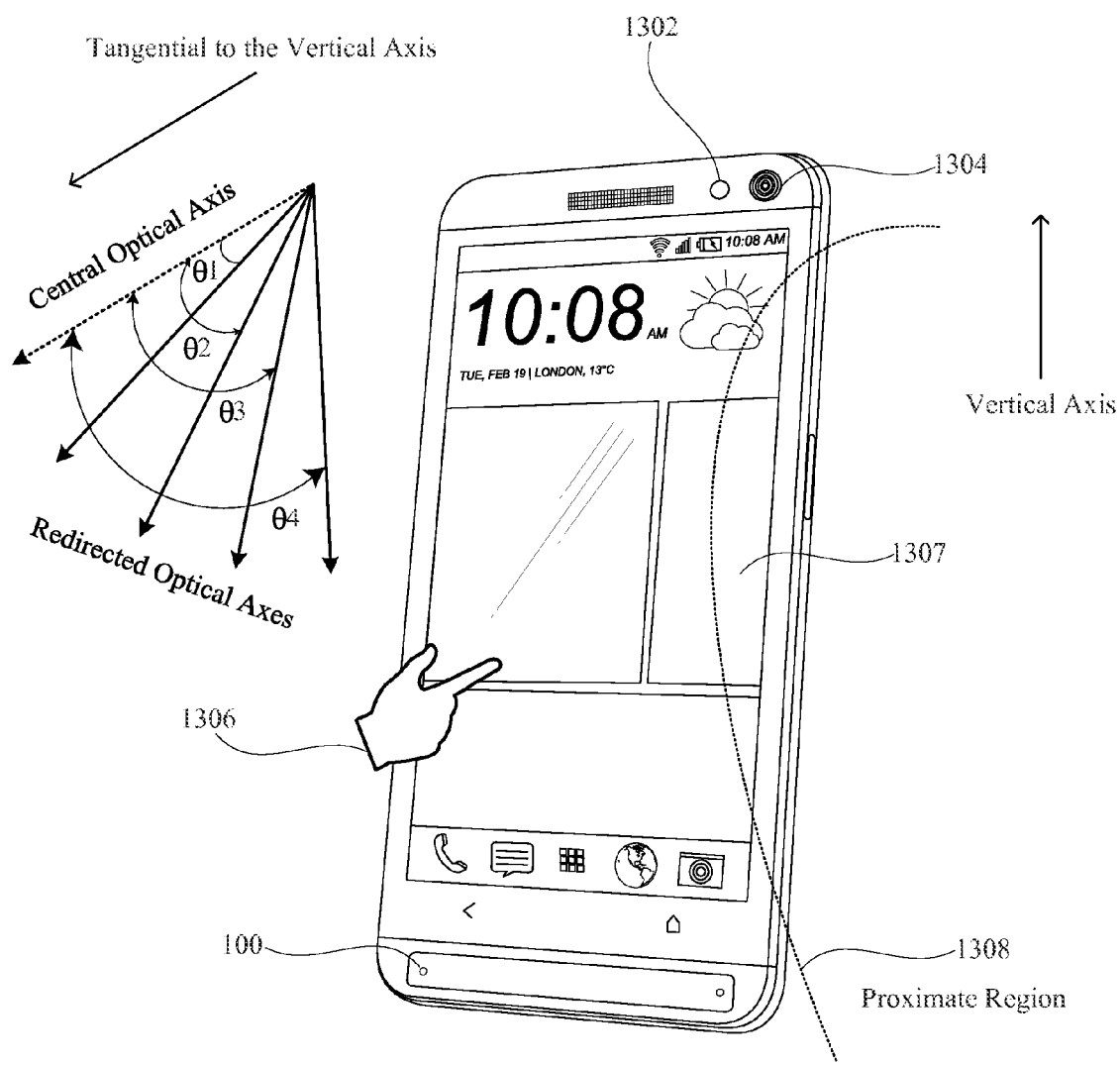
FIG. 13 depicts one implementation of a Fresnel prismatic element and/or a triangular solid prism redirecting one or more optical axes of one or more cameras of a smartphone.

FIG. 13 depicts one implementation of a Fresnel prismatic element 1304 and/or a triangular solid prism 1304 redirecting one or more optical axes of one or more cameras 1304 of a smartphone 1300 with a camera controller 100. In FIG. 13, the Fresnel prismatic element 1304 and/or the triangular solid prism 1304 redirect the optical axes of the camera 1304 that are originally within 20 degrees of the tangential to the vertical axis. In different implementations, the optical axes are redirected to different angles ♦1-♦4 ranging from 20 degrees to 85 degrees. This enhances the field of view of the camera 1304 and augments the 3D sensor spaces in which it can detect gestures 1306 performed across regions or points 1308 proximate to the display 1307 of the smartphone 1300. In one implementation, range of the proximate regions or points relative to the display is user definable. In other implementations, smartphone 1300 includes another camera 1302 to which the Fresnel prismatic element 1304 and/or the triangular solid prism 1304 are not applied and thus, it captures gestures performed across regions or points other than regions or points 1308 proximate to the display 1307 of the smartphone 1300.

Figure 14:
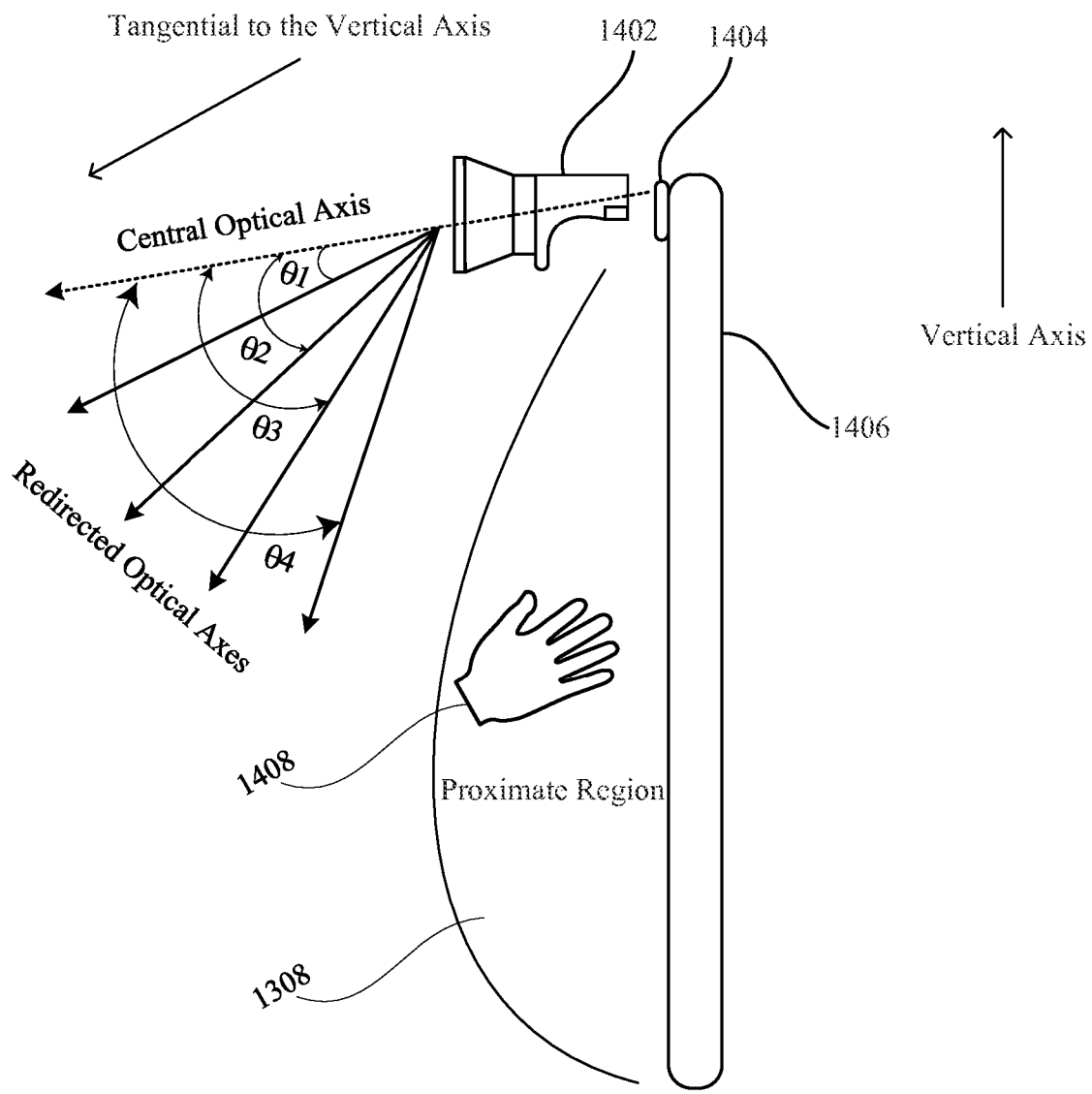
FIG. 14 depicts one implementation of a removable Fresnel prismatic element and/or a triangular solid prism redirecting one or more optical axes of one or more cameras of a smartphone.

FIG. 14 depicts one implementation 1400 of a removable Fresnel prismatic element 1402 and/or a triangular solid prism 1402 redirecting one or more optical axes of one or more cameras 1404 of a smartphone 1406. In FIG. 13, the removable Fresnel prismatic element 1402 and/or the triangular solid prism 1402 redirect the optical axes of the camera 1404 that are originally within 20 degrees of the tangential to the vertical axis. In different implementations, the optical axes are redirected to different angles ♦1-♦4 ranging from 20 degrees to 85 degrees. This enhances the field of view of the camera 1404 and augments the 3D sensor spaces in which it can detect gestures 1408 performed across regions or points 1308 proximate to the smartphone 1406. In one implementation, range of the proximate regions or points relative to the display is user definable.

Methods

Figure 15:
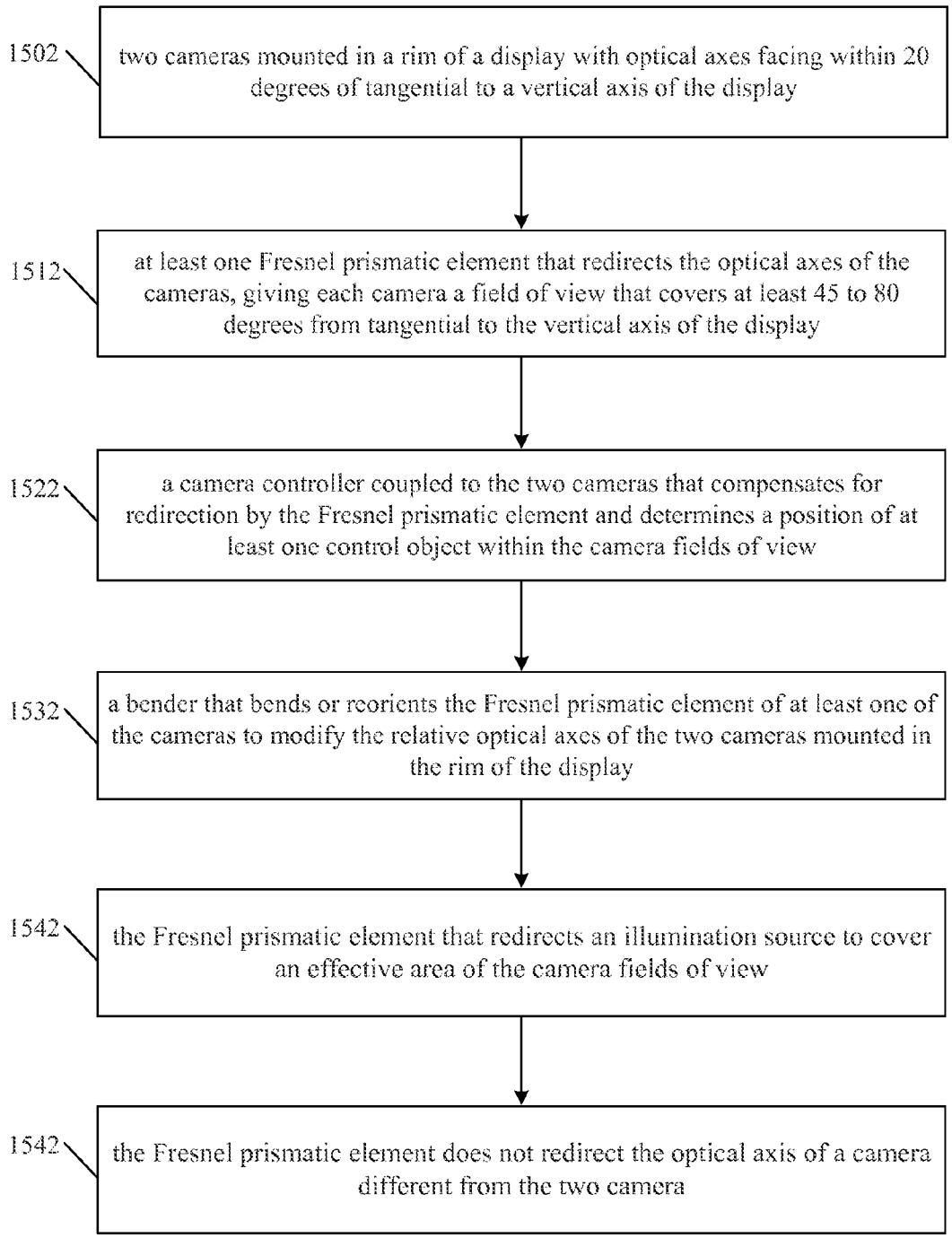
FIG. 15 illustrates an example method of enhancing a field of view of cameras to augment three-dimensional (3D) sensory space for free-space gesture interpretation using a Fresnel prismatic element.

FIG. 15 illustrates an example method of enhancing a field of view of cameras to augment three-dimensional (3D) sensory space for free-space gesture interpretation using a Fresnel prismatic element. Flowchart 1500 can be implemented by one or more processors configured to receive or retrieve information, process the information, store results, and transmit the results. Other implementations may perform the actions in different orders and/or with different, varying, alternative, modified, fewer or additional actions than those illustrated in FIG. 15. Multiple actions can be combined in some implementations. For convenience, this flowchart is described with reference to the system that carries out a method. The system is not necessarily part of the method.

At action 1502, two cameras are mounted in a rim of a display with optical axes facing within 20 degrees of tangential to a vertical axis of the display. Configuring the optical axes to be within 20 degrees of the tangential to the vertical axis assists in the function of the Fresnel prismatic element, which may have a limited redirection capacity.

At action 1512, at least one Fresnel prismatic element is used to redirect the optical axes of the cameras, giving each camera a field of view that covers at least 45 to 80 degrees from tangential to the vertical axis of the display that can be planar, cylindrical, or of any other shape such as globular. In other implementations, the Fresnel prismatic element that redirects the optical axes of the cameras, giving each camera a field of view that covers at least 20 to 85 degrees from tangential to the vertical axis of the display.

In one implementation, the Fresnel prismatic element can be an optical film applied to the camera. In another implementation, the Fresnel prismatic element can be a removable structure attached to the cameras. In yet another implementation, the Fresnel prismatic element can be included in a membrane pressed against the cameras.

At action 1522, a camera controller coupled to the two cameras is used to compensate for redirection by the Fresnel prismatic element and to determine a position of at least one control object within the camera fields of view. In one implementation, compensation for the redirection by the Fresnel prismatic element can be achieved by collecting the redirected optical axes on an intraocular lens. In another implementation, it can be achieved by applying at least one of an amplification function, polynomial function, transcendental function, and a step function to the frame data captured using the optical axes.

At action 1532, a bender that bends or reorients the Fresnel prismatic element of at least one of the cameras is used to modify the relative optical axes of the two cameras mounted in the rim of the display.

At action 1542, the Fresnel prismatic element that redirects an illumination source coupled to the camera controller to cover an effective area of the camera fields of view.

At action 1552, at least one camera, different from the two cameras mounted at action 1502, is mounted in the rim of the display with an optical axis facing within 20 degrees of tangential to a vertical axis of the display. The Fresnel prismatic element does not redirect the optical axis of the camera, according to one implementation.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 16:
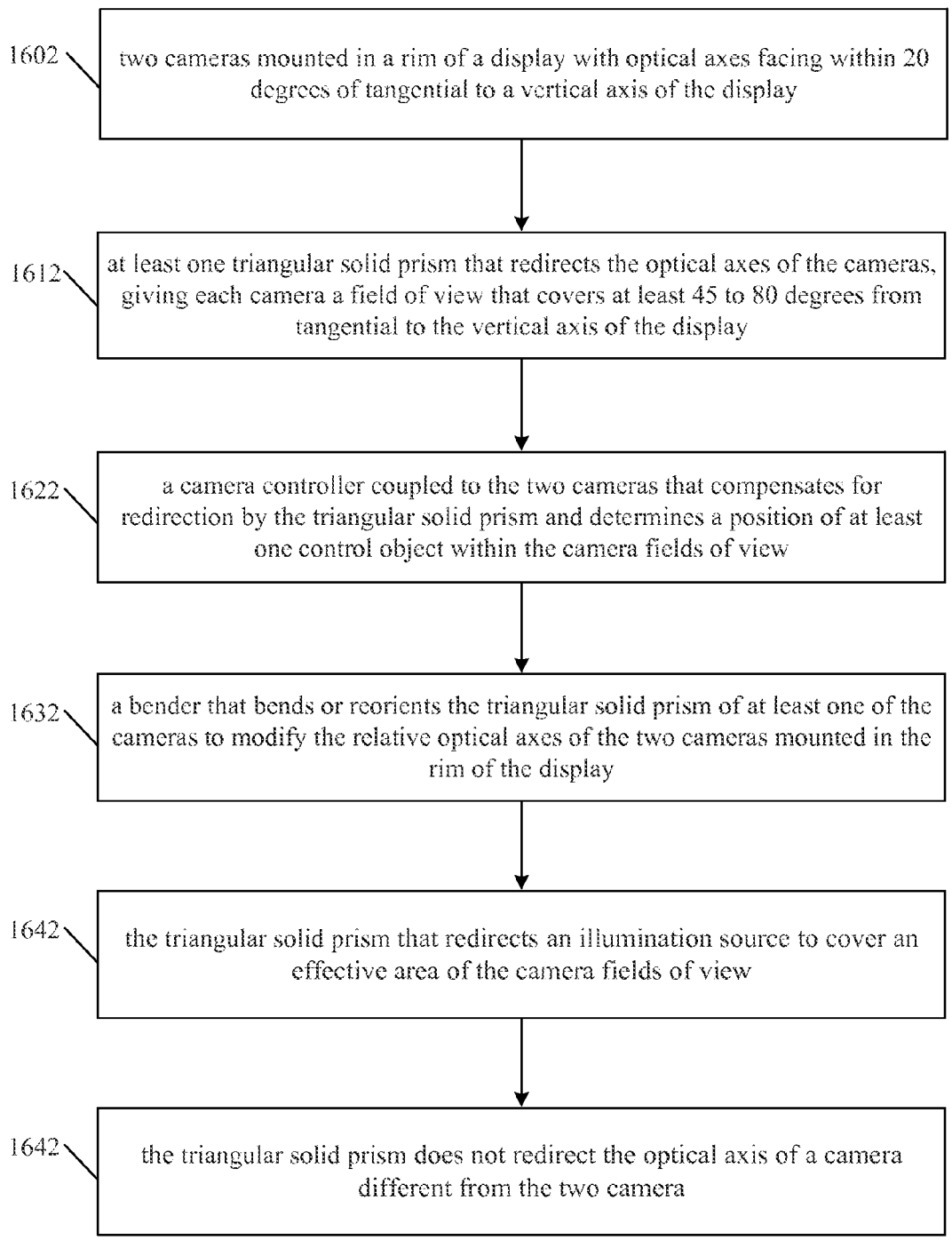
FIG. 16 is a representative method of enhancing a field of view of cameras to augment three-dimensional (3D) sensory space for free-space gesture interpretation using a triangular solid prism.

FIG. 16 is a representative method of enhancing a field of view of cameras to augment three-dimensional (3D) sensory space for free-space gesture interpretation using a triangular solid prism. Flowchart 1600 can be implemented by one or more processors configured to receive or retrieve information, process the information, store results, and transmit the results. Other implementations may perform the actions in different orders and/or with different, varying, alternative, modified, fewer or additional actions than those illustrated in FIG. 16. Multiple actions can be combined in some implementations. For convenience, this flowchart is described with reference to the system that carries out a method. The system is not necessarily part of the method.

At action 1602, two cameras are mounted in a rim of a display with optical axes facing within 20 degrees of tangential to a vertical axis of the display. Configuring the optical axes to be within 20 degrees of the tangential to the vertical axis assists in the function of the triangular solid prism, which may have a limited redirection capacity.

At action 1612, at least one triangular solid prism is used to redirect the optical axes of the cameras, giving each camera a field of view that covers at least 45 to 80 degrees from tangential to the vertical axis of the display that can be planar, cylindrical, or of any other shape such as globular. In other implementations, the triangular solid prism that redirects the optical axes of the cameras, giving each camera a field of view that covers at least 20 to 85 degrees from tangential to the vertical axis of the display.

In one implementation, the triangular solid prism can be an optical film applied to the camera. In another implementation, the triangular solid prism can be a removable structure attached to the cameras. In yet another implementation, the triangular solid prism can be included in a membrane pressed against the cameras.

At action 1622, a camera controller coupled to the two cameras is used to compensate for redirection by the triangular solid prism and to determine a position of at least one control object within the camera fields of view. In one implementation, compensation for the redirection by the triangular solid prism can be achieved by collecting the redirected optical axes on an intraocular lens. In another implementation, it can be achieved by applying at least one of an amplification function, polynomial function, transcendental function, and a step function to the frame data captured using the optical axes.

At action 1632, a bender that bends or reorients the triangular solid prism of at least one of the cameras is used to modify the relative optical axes of the two cameras mounted in the rim of the display.

At action 1642, the triangular solid prism that redirects an illumination source coupled to the camera controller to cover an effective area of the camera fields of view.

At action 1652, at least one camera, different from the two cameras mounted at action 1602, is mounted in the rim of the display with an optical axis facing within 20 degrees of tangential to a vertical axis of the display. The triangular solid prism does not redirect the optical axis of the camera, according to one implementation.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Figure 17:
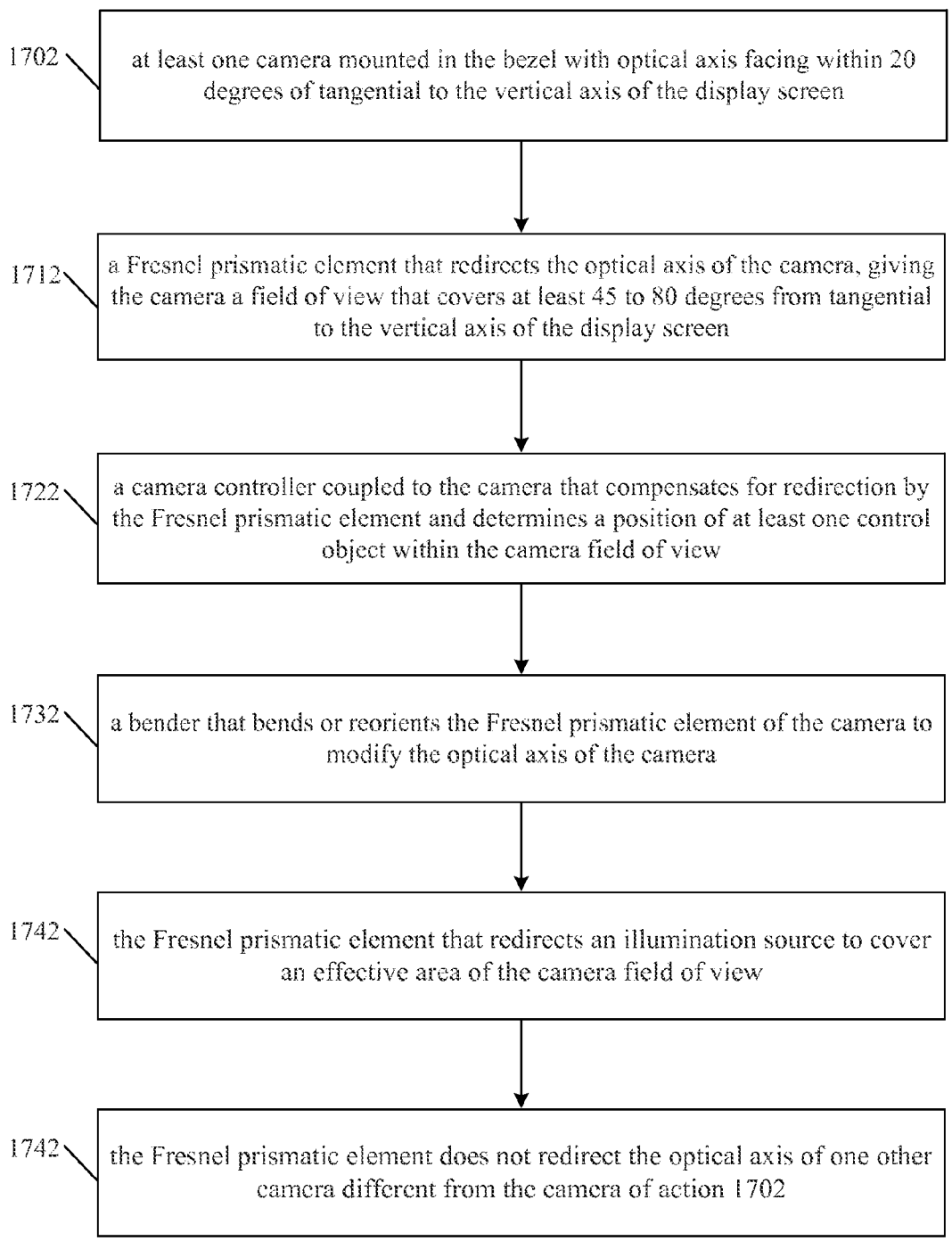
FIG. 17 shows a flowchart enhancing a field of view of at least one camera of a portable electronic device to augment three-dimensional (3D) sensory space for free-space gesture interpretation using a triangular solid prism.

FIG. 17 shows a flowchart enhancing a field of view of at least one camera of a portable electronic device to augment three-dimensional (3D) sensory space for free-space gesture interpretation using a triangular solid prism. Flowchart 1700 can be implemented by one or more processors configured to receive or retrieve information, process the information, store results, and transmit the results. Other implementations may perform the actions in different orders and/or with different, varying, alternative, modified, fewer or additional actions than those illustrated in FIG. 17. Multiple actions can be combined in some implementations. For convenience, this flowchart is described with reference to the system that carries out a method. The system is not necessarily part of the method.

At action 1702, at least one camera is mounted in a bezel of a display screen of a portable electronic device. The portable electronic device can be any type of user computing devices such as a personal computer, laptop computer, tablet computer, smartphone, personal digital assistant (PDA), digital image capture devices, and the like. The camera has an optical axis facing within 20 degrees of tangential to a vertical axis of the display screen. Configuring the optical axis to be within 20 degrees of the tangential to the vertical axis assists in the function of the Fresnel prismatic element, which may have a limited redirection capacity.

At action 1712, at least one Fresnel prismatic element is used to redirect the optical axis of the camera, giving the camera a field of view that covers at least 45 to 80 degrees from tangential to the vertical axis of the display screen that can be planar, cylindrical, or of any other shape such as globular. In other implementations, the Fresnel prismatic element that redirects the optical axis of the camera, giving the camera a field of view that covers at least 20 to 85 degrees from tangential to the vertical axis of the display screen of the portable electronic device.

In one implementation, the Fresnel prismatic element can be an optical film applied to the camera. In another implementation, the Fresnel prismatic element can be a removable structure attached to the camera. In yet another implementation, the Fresnel prismatic element can be included in a membrane pressed against the camera.

At action 1722, a camera controller coupled to the camera is used to compensate for redirection by the Fresnel prismatic element and to determine a position of at least one control object within the camera field of view. In one implementation, compensation for the redirection by the Fresnel prismatic element can be achieved by collecting the redirected optical axis on an intraocular lens. In another implementation, it can be achieved by applying at least one of an amplification function, polynomial function, transcendental function, and a step function to the frame data captured using the optical axis.

At action 1732, a bender that bends or reorients the Fresnel prismatic element of the camera is used to modify the relative optical axis of the camera mounted in the bezel of the display screen of the portable electronic device.

At action 1742, the Fresnel prismatic element that redirects an illumination source coupled to the camera controller to cover an effective area of the camera field of view.

At action 1752, at least one other camera, different from the camera mounted at action 1702, is mounted in the bezel of the display screen with an optical axis facing within 20 degrees of tangential to a vertical axis of the display screen. The Fresnel prismatic element does not redirect the optical axis of this other camera, according to one implementation.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A rim mounted space imaging apparatus, mounted in a rim of a display that has a vertical axis, comprising:
    two cameras mounted in the rim of a display with optical axes facing within 20 degrees of tangential to a vertical axis of the display;
    at least one Fresnel prismatic element that redirects the optical axes of the cameras, giving each camera a field of view that covers at least 45 to 80 degrees from tangential to the vertical axis of the display; and
    a camera controller coupled to the two cameras that compensates for redirection by the Fresnel prismatic element and determines a position of at least one control object within the camera fields of view.

2. The apparatus of claim 1, further comprising:
    a bender that bends or reorients the Fresnel prismatic element of at least one of the cameras to modify the relative optical axes of the two cameras mounted in the rim of the display.

3. The apparatus of claim 1, further comprising:
    at least one illumination source; and
    the Fresnel prismatic element that redirects the illumination source to cover an effective area of the camera fields of view.

4. The apparatus of claim 1, further comprising:
    the Fresnel prismatic element that redirects the optical axes of the cameras, giving each camera a field of view that covers at least 20 to 85 degrees from tangential to the vertical axis of the display.

5. The apparatus of claim 1, further comprising:
    at least one camera mounted in the rim of the display with an optical axis facing within 20 degrees of tangential to a vertical axis of the display, wherein the camera is different from the two cameras of claim 1; and
    the Fresnel prismatic element does not redirect the optical axis of the camera.

6. The apparatus of claim 1, wherein the display is at least one of planar or cylindrical.

7. The apparatus of claim 1, wherein the Fresnel prismatic element is an optical film.

8. A rim mounted space imaging apparatus, mounted in a rim of a display that has a vertical axis, comprising:
    two cameras mounted in the rim of a display with optical axes facing within 20 degrees of tangential to a vertical axis of the display;
    at least one triangular solid prism that redirects the optical axes of the cameras, giving each camera a field of view that covers at least 45 to 80 degrees from tangential to the vertical axis of the display; and
    a camera controller coupled to the two cameras that compensates for redirection by the triangular solid prism and determines a position of at least one control object within the camera fields of view.

9. The apparatus of claim 8, further comprising:
    a bender that bends or reorients the triangular solid prism of at least one of the cameras to modify the relative optical axes of the two cameras mounted in the rim of the display.

10. The apparatus of claim 8, further comprising:
    at least one illumination source; and
    the triangular solid prism that redirects the illumination source to cover an effective area of the camera fields of view.

11. The apparatus of claim 8, further comprising:
    the triangular solid prism that redirects the optical axes of the cameras, giving each camera a field of view that covers at least 20 to 85 degrees from tangential to the vertical axis of the display.

12. The apparatus of claim 8, further comprising:
    at least one camera mounted in the rim of the display with an optical axis facing within 20 degrees of tangential to a vertical axis of the display, wherein the camera is different from the two cameras of claim 8; and
    the triangular solid prism does not redirect the optical axis of the camera.

13. The apparatus of claim 8, wherein the display is at least one of planar or cylindrical.

14. The apparatus of claim 8, wherein the triangular solid prism is an optical film.

15. A portable electronic device with a bezel for a display screen, comprising:
    a bezel for a display screen that has a vertical axis;
    at least one camera mounted in the bezel with optical axis facing within 20 degrees of tangential to the vertical axis of the display screen;
    a Fresnel prismatic element that redirects the optical axis of the camera, giving the camera a field of view that covers at least 45 to 80 degrees from tangential to the vertical axis of the display screen; and
    a camera controller coupled to the camera that compensates for redirection by the Fresnel prismatic element and determines a position of at least one control object within the camera field of view.

16. The apparatus of claim 15, wherein the Fresnel prismatic element is an optical film.

17. The portable electronic device of claim 15, further comprising:
    a bender that bends or reorients the Fresnel prismatic element of the camera to modify the optical axis of the camera.

18. The portable electronic device of claim 15, further comprising:
    at least one illumination source; and
    the Fresnel prismatic element that redirects the illumination source to cover an effective area of the camera field of view.

19. The portable electronic device of claim 15, further comprising:
    the Fresnel prismatic element that redirects the optical axis of the camera, giving the camera a field of view that covers at least 20 to 85 degrees from tangential to the vertical axis of the display screen.

20. The portable electronic device of claim 15, further comprising:
    at least one other camera mounted in the bezel with an optical axis facing within 20 degrees of tangential to a vertical axis of the display screen, wherein the other camera is different from the camera of claim 14; and
the Fresnel prismatic element does not redirect the optical axis of the other camera.

* * * * *